US012792352B2

(12) United States Patent
Botman et al.

(10) Patent No.: US 12,792,352 B2
(45) Date of Patent: Nov. 10, 2026

(54) TECHNIQUE FOR PERFORMING MEMORY ACCESS OPERATIONS

(71) Applicant: Arm Limited, Cambridge (GB)

(72) Inventors: François Christopher Jacques Botman, Cambridge (GB); Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 86 days.

(21) Appl. No.: 18/835,476

(22) PCT Filed: Dec. 20, 2022

(86) PCT No.: PCT/GB2022/053313

§ 371 (c)(1),
(2) Date: Aug. 2, 2024

(87) PCT Pub. No.: WO2023/148467

PCT Pub. Date: Aug. 10, 2023

(65) Prior Publication Data

US 2025/0156182 A1 May 15, 2025

(30) Foreign Application Priority Data

Feb. 7, 2022 (GB) ...................................... 2201544

(51) Int. Cl.
*G06F 9/30* (2018.01)

(52) U.S. Cl.
CPC ...... *G06F 9/30145* (2013.01); *G06F 9/30036* (2013.01); *G06F 9/30101* (2013.01)

(58) Field of Classification Search
CPC ............... G06F 9/3004; G06F 9/30043; G06F 9/30036; G06F 9/30145; G06F 9/30101;
(Continued)

(56) References Cited

U.S. PATENT DOCUMENTS

2015/0149744 A1 5/2015 Pedersen
2018/0181347 A1 6/2018 Botman et al.
(Continued)

FOREIGN PATENT DOCUMENTS

GB 2540206 1/2017
TW 201830234 8/2018

OTHER PUBLICATIONS

Office Action for EP Application No. 22835100.3 dated Nov. 13, 2025, 5 pages.
Combined Search and Examination Report for an International Application No. GB2201544.0, dated Sep. 28, 2022.
International Search Report and Written Opinion for an International Application No. PCT/GB2022/053313 dated Dec. 20, 2022.
Bedichek "Some Efficient Architecture Simulation Techniques," Department of Computer Science, University of Washington, Seattle, Washington 98195.
(Continued)

*Primary Examiner* — Jyoti Mehta
*Assistant Examiner* — Kasim Alli
(74) *Attorney, Agent, or Firm* — NIXON & VANDERHYE P.C.

(57) ABSTRACT

An apparatus is described having processing circuitry to perform vector processing operations, a set of vector registers, and an instruction decoder to decode vector instructions to control the processing circuitry to perform the required operations. The instruction decoder is responsive to a given vector memory access instruction specifying a plurality of memory access operations, where each memory access operation is to be performed to access an associated data element, to determine, from a data vector indication field of the given vector memory access instruction, at least one vector register in the set of vector registers associated with a plurality of data elements, and to determine, from at least one capability vector indication field of the given vector memory access instruction, a plurality of vector registers in the set of vector registers containing a plurality of capabilities. Each capability is associated with one of the data elements in the plurality of data elements and provides an address indication and constraining information constraining use of that address indication when accessing memory.
(Continued)

The number of vector registers determined from the at least one capability vector indication field is greater than the number of vector registers determined from the data vector indication field. The instruction decoder controls the processing circuitry: to determine, for each given data element in the plurality of data elements, a memory address based on the address indication provided by the associated capability, and to determine whether the memory access operation to be used to access the given data element is allowed in respect of that determined memory address having regard to the constraining information of the associated capability; and to enable performance of the memory access operation for each data element for which the memory access operation is allowed.

20 Claims, 15 Drawing Sheets

(58) Field of Classification Search
CPC ........ G06F 9/3016; G06F 9/468; G06F 12/14; G06F 12/1416; G06F 12/1441; G06F 12/1458
See application file for complete search history.

(56) References Cited

U.S. PATENT DOCUMENTS

| | | | | |
|---|---|---|---|---|
| 2018/0349294 | A1* | 12/2018 | Barnes | G06F 12/1441 |
| 2019/0205137 | A1* | 7/2019 | Meadows | G06F 9/30036 |
| 2021/0200546 | A1* | 7/2021 | Lemay | G06F 12/145 |
| 2023/0195461 | A1* | 6/2023 | LeMay | G06F 9/3013<br>712/208 |
| 2023/0305969 | A1* | 9/2023 | Waterman | G06F 12/1441 |

OTHER PUBLICATIONS

Watson et al., "Capability Hardware Enhanced RISC Instructions: CHERI Instruction-Set Architecture," Technical Report, Oct. 2020.

Mach et al., "FPnew: An Open-Source Multi-Format Floating-Point Unit Architecture for Energy-Proportional Transprecision Computing," Jul. 3, 2020.

Office Action for IN Application No. 202417059131 dated Jan. 8, 2026, 9 pages.

Office Action for TW Application No. 112103610 issued Jun. 30, 2026 and English translation, 10 pages.

* cited by examiner

TECHNIQUE FOR PERFORMING MEMORY ACCESS OPERATIONS

BACKGROUND

The present technique relates to the field of data processing, and more particularly to the handling of memory access operations.

Vector processing systems have been developed that seek to improve code density, and often performance, by enabling a given vector instruction to be executed in order to cause an operation defined by that given vector instruction to be performed independently in respect of multiple data elements within a vector of data elements. In the context of memory access operations, it is hence possible to load a plurality of contiguous data elements from memory into a specified vector register in response to a vector load instruction or to store a plurality of contiguous data elements from a specified vector register to memory in response to a vector store instruction. It is also possible to provide vector gather or vector scatter variants of those vector load or store instructions, so as to allow the data elements processed to reside at arbitrary locations in memory. When using such vector gather or vector scatter instructions, in addition to a vector being identified for the plurality of data elements to be processed, a vector can also be identified to provide a plurality of address indications used to determine the memory address of each data element.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

Each capability can include constraining information that is used to restrict the operations that can be performed when using that capability. For instance, considering a bounded pointer, this may provide information used to identify a non-extendable range of memory addresses accessible by processing circuitry when using that capability, along with one or more permission flags identifying associated permissions.

It would be desirable to support the execution of vector gather or vector scatter instructions, but whilst enabling the various address indications to be specified by capabilities, in order to benefit from the security benefits offered through the use of capabilities. However, capabilities that provide an address indication are inherently larger than an equivalent standard address indication, due to the constraining information that is provided in association with the address indication to form the capability.

SUMMARY

In a first example arrangement there is provided an apparatus comprising: processing circuitry to perform vector processing operations; a set of vector registers; and an instruction decoder to decode vector instructions to control the processing circuitry to perform the vector processing operations specified by the vector instructions; wherein: the instruction decoder is responsive to a given vector memory access instruction specifying a plurality of memory access operations, where each memory access operation is to be performed to access an associated data element, to determine, from a data vector indication field of the given vector memory access instruction, at least one vector register in the set of vector registers associated with a plurality of data elements, and to determine, from at least one capability vector indication field of the given vector memory access instruction, a plurality of vector registers in the set of vector registers containing a plurality of capabilities, each capability being associated with one of the data elements in the plurality of data elements and providing an address indication and constraining information constraining use of that address indication when accessing memory, wherein the number of vector registers determined from the at least one capability vector indication field is greater than the number of vector registers determined from the data vector indication field; the instruction decoder is further arranged to control the processing circuitry: to determine, for each given data element in the plurality of data elements, a memory address based on the address indication provided by the associated capability, and to determine whether the memory access operation to be used to access the given data element is allowed in respect of that determined memory address having regard to the constraining information of the associated capability; and to enable performance of the memory access operation for each data element for which the memory access operation is allowed, where performance of the memory access operation for any given data element causes that given data element to be moved between the determined memory address in the memory and the at least one vector register.

In a further example arrangement there is provided a method of performing memory access operations within an apparatus providing processing circuitry to perform vector processing operations and a set of vector registers, the method comprising: employing an instruction decoder, in response to a given vector memory access instruction specifying a plurality of memory access operations, where each memory access operation is to be performed to access an associated data element, to determine, from a data vector indication field of the given vector memory access instruction, at least one vector register in the set of vector registers associated with a plurality of data elements, and to determine, from at least one capability vector indication field of the given vector memory access instruction, a plurality of vector registers in the set of vector registers containing a plurality of capabilities, each capability being associated with one of the data elements in the plurality of data elements and providing an address indication and constraining information constraining use of that address indication when accessing memory, wherein the number of vector registers determined from the at least one capability vector indication field is greater than the number of vector registers determined from the data vector indication field; controlling the processing circuitry: to determine, for each given data element in the plurality of data elements, a memory address based on the address indication provided by the associated capability, and to determine whether the memory access operation to be used to access the given data element is allowed in respect of that determined memory address having regard to the constraining information of the associated capability; and to enable performance of the memory access operation for each data element for which the memory access operation is allowed, where performance of the memory access operation for any given data element causes that given data element to be moved between the determined memory address in the memory and the at least one vector register.

In a still further example arrangement there is provided a computer program for controlling a host data processing apparatus to provide an instruction execution environment, comprising: processing program logic to perform vector processing operations; vector register emulating program logic to emulate a set of vector registers; and instruction decode program logic to decode vector instructions to control the processing program logic to perform the vector processing operations specified by the vector instructions; wherein: the instruction decode program logic is responsive to a given vector memory access instruction specifying a plurality of memory access operations, where each memory access operation is to be performed to access an associated data element, to determine, from a data vector indication field of the given vector memory access instruction, at least one vector register in the set of vector registers associated with a plurality of data elements, and to determine, from at least one capability vector indication field of the given vector memory access instruction, a plurality of vector registers in the set of vector registers containing a plurality of capabilities, each capability being associated with one of the data elements in the plurality of data elements and providing an address indication and constraining information constraining use of that address indication when accessing memory, wherein the number of vector registers determined from the at least one capability vector indication field is greater than the number of vector registers determined from the data vector indication field; the instruction decode program logic is further arranged to control the processing program logic: to determine, for each given data element in the plurality of data elements, a memory address based on the address indication provided by the associated capability, and to determine whether the memory access operation to be used to access the given data element is allowed in respect of that determined memory address having regard to the constraining information of the associated capability; and to enable performance of the memory access operation for each data element for which the memory access operation is allowed, where performance of the memory access operation for any given data element causes that given data element to be moved between the determined memory address in the memory and the at least one vector register.

In a yet further example arrangement there is provided an apparatus comprising: processing means for performing vector processing operations; a set of vector register means; and instruction decode means for decoding vector instructions to control the processing means to perform the vector processing operations specified by the vector instructions; wherein: the instruction decode means, responsive to a given vector memory access instruction specifying a plurality of memory access operations, where each memory access operation is to be performed to access an associated data element, for determining, from a data vector indication field of the given vector memory access instruction, at least one vector register means in the set of vector register means associated with a plurality of data elements, and for determining, from at least one capability vector indication field of the given vector memory access instruction, a plurality of vector register means in the set of vector register means containing a plurality of capabilities, each capability being associated with one of the data elements in the plurality of data elements and providing an address indication and constraining information constraining use of that address indication when accessing memory, wherein the number of vector register means determined from the at least one capability vector indication field is greater than the number of vector register means determined from the data vector indication field; the instruction decode means is further arranged for controlling the processing means: to determine, for each given data element in the plurality of data elements, a memory address based on the address indication provided by the associated capability, and to determine whether the memory access operation to be used to access the given data element is allowed in respect of that determined memory address having regard to the constraining information of the associated capability; and to enable performance of the memory access operation for each data element for which the memory access operation is allowed, where performance of the memory access operation for any given data element causes that given data element to be moved between the determined memory address in the memory and the at least one vector register means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
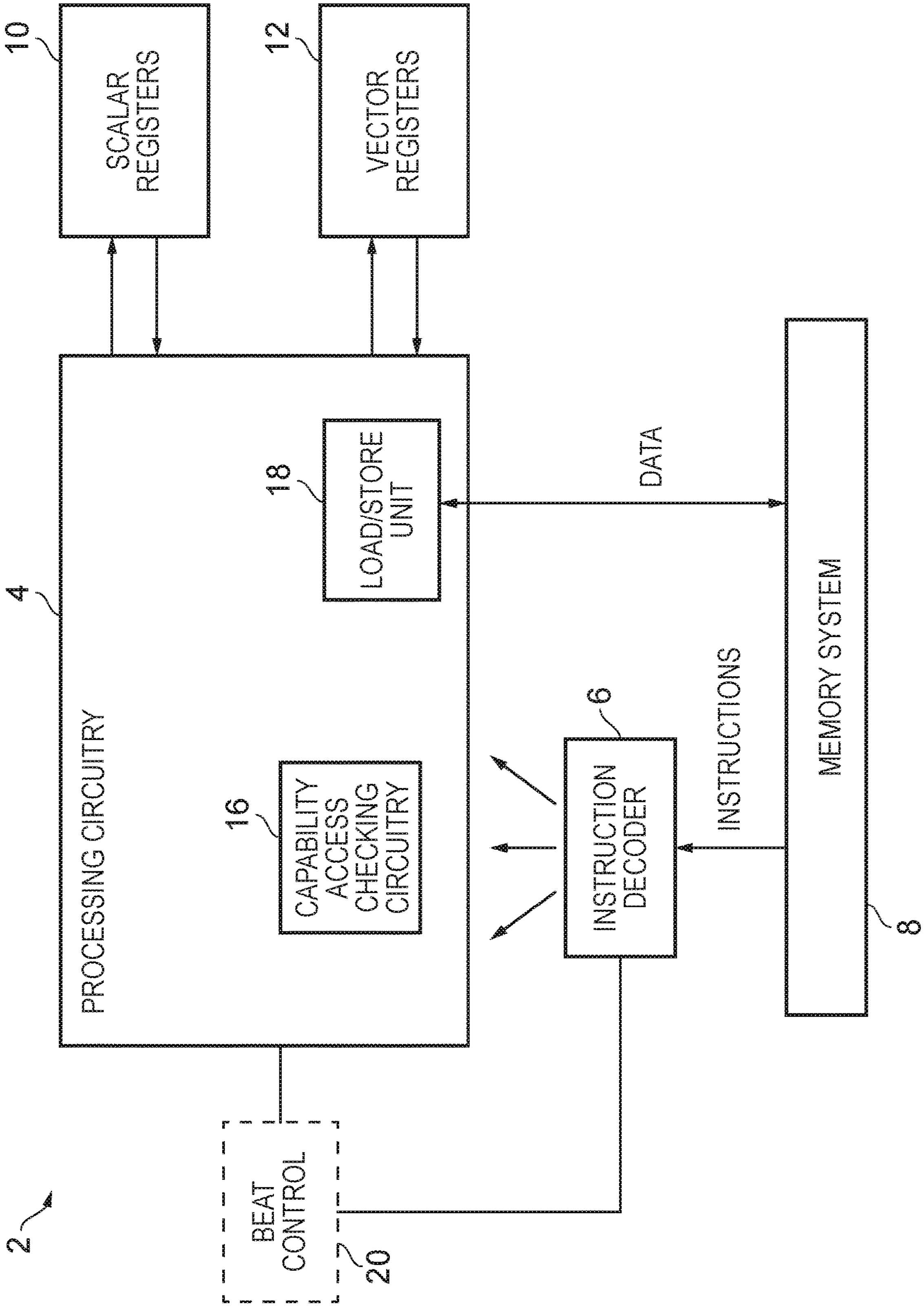
FIG. 1 is a block diagram of an apparatus in accordance with one example implementation.

In accordance with the techniques described herein, an apparatus is provided that has processing circuitry to perform vector processing operations, a set of vector registers, and an instruction decoder to decode vector instructions to control the processing circuitry to perform the vector processing operations specified by the vector instructions. The vector processing operation specified by a vector instruction may be implemented by performing the required operation independently on each of a plurality of data elements in a vector, and those required operations may be performed in parallel, sequentially one after the other, or in groups (where for example the operations in a group may be performed in parallel, and each group may be performed sequentially).

The instruction decoder may be arranged to process a given vector memory access instruction specifying a plurality of memory access operations, where each memory access operation is to be performed to access an associated data element, and hence the plurality of memory access operations can collectively be viewed as implementing a vector memory access operation specified by the vector memory access instruction. In particular, in response to such a given vector memory access instruction, the instruction decoder may be arranged to determine, from a data vector indication field of the given vector memory access instruction, at least one vector register in the set of vector registers associated with a plurality of data elements. Each vector register determined from the data vector indication field may hence for example form a source register for a vector scatter operation seeking to store data elements from that source register to various locations in memory, or may act as a destination register for a vector gather operation seeking to load data elements from various locations in memory for storage in that vector register.

The instruction decoder is also arranged to determine, from at least one capability vector indication field of the given vector memory access instruction, a plurality of vector registers in the set of vector registers containing a plurality of capabilities. In one example implementation, a single capability vector indication field is used, and the plurality of vector registers are determined from the information in that single capability vector indication field. However, in an alternative implementation, multiple capability vector indication fields may be provided, for example to allow each capability vector indication field to identify a corresponding vector register. In one example implementation each vector register of the plurality of vector registers contains a plurality of capabilities, whilst in another example each vector register of the plurality of vector registers contains a single capability.

Each capability in the determined plurality of vector registers is associated with one of the data elements in the plurality of data elements and provides an address indication and constraining information constraining use of that address indication when accessing memory. The constraining information can take a variety of forms, but may for example identify range information that is used to determine an allowable range of memory addresses that may be accessed when using the address indication provided by the capability, and/or one or more permission attributes specifying types of accesses that may be performed using the address indication (for example whether read accesses are allowed, whether write accesses are allowed, whether the capability can be used to generate memory addresses of instructions to be fetched and executed, whether accesses are allowed from a particular level of security or privilege, etc.). In a further example the constraining information may be a constraint identifying value indicative of an entry in a set of constraint information. Each entry in the set of constraint information can take a variety of forms, but may for example identify range information that is used to determine an allowable range of memory addresses that may be accessed when using the address indication provided by the capability, and/or one or more permission attributes specifying types of accesses that may be performed using the address indication (for example whether read accesses are allowed, whether write accesses are allowed, whether the capability can be used to generate memory addresses of instructions to be fetched and executed, whether accesses are allowed from a particular level of security or privilege, etc.). In some implementations the generated memory address may be a physical memory address that directly correspond to a location in the memory system, whereas in other implementations the generated memory address may be a virtual address upon which address translation may need to be performed in order to determine the physical memory address to access.

In accordance with the techniques described herein, the number of vector registers determined from the at least one capability vector indication field is greater than the number of vector registers determined from the data vector indication field.

The instruction decoder is further arranged to control the processing circuitry to determine, for each given data element in the plurality of data elements, a memory address (which may be either a virtual address or a physical address) based on the address indication provided by the associated capability, and to determine whether the memory access operation to be used to access the given data element is allowed in respect of that determined memory address having regard to the constraining information of the associated capability. As mentioned earlier, the constraining information can take a variety of forms, and hence the checks performed here to determine whether the memory access operation to be used to access the given data element is allowed may take various forms. Those checks may hence for example identify whether the determined memory address can be accessed given any range constraining information in the capability, but also may determine whether the type of access is allowed (e.g. if the access operation is to perform a write to memory, does the constraining information in the capability allow such a write to be performed).

The processing circuitry can then be arranged to enable performance of the memory access operation for each data element for which the memory access operation is allowed, where performance of the memory access operation for any given data element causes that given data element to be moved between the determined memory address in the memory and the at least one vector register (it being appreciated that the direction of movement depends upon whether the data is being loaded from memory into the registers or stored from the registers into memory). In one example implementation, the given data element in the original location may be left untouched during this process, and hence in that case the move operation may be performed by copying the given data element. This, for example, may typically be the case at least when loading a data element from memory for storage within a vector register, where the data element then stored within the vector register is a copy of the data element stored in memory.

Whilst in one example implementation the memory access operations may be performed for each data element for which those memory access operations are allowed, in other implementations it may be decided to suppress performance of one or more allowed memory access operations in instances where another of the memory access operations is not allowed. Exactly which allowable accesses get suppressed in such a situation may depend on the implementation, and where in the vector of data elements the data element whose associated access is not allowed is. Purely by way of illustrative example, it may be that the various accesses are performed sequentially, and hence when one access is detected that is not allowed, it may be decided to suppress the subsequent accesses irrespective of whether they are allowed or not, but with the earlier accesses having already been performed.

In one example implementation, a mechanism is provided to keep track of valid capabilities stored within the vector registers. In particular, in one example implementation, the apparatus further comprises capability indication storage providing a valid capability indication field in association with each capability sized block within given vector registers of the set of vector registers, wherein each valid capability indication field is arranged to be set to indicate when the associated capability sized block stores a valid capability and is otherwise cleared. Whilst in one example implementation any of the vector registers in the set of vector registers may be able to store capabilities, in another example implementation the ability to store capabilities may be limited to a subset of the vector registers in the set, and in that latter case the capability indication storage will only need to provide a valid capability indication field for each capability sized block within that subset of the vector registers.

Whilst in one example implementation the capability indication storage may be provided separately to the set of vector registers, in an alternative example implementation the capability indication storage may be incorporated within the set of vector registers.

In order to constrain how the valid capability indication fields are set, the processing circuitry may be arranged to only allow any valid capability indication field to be set to indicate that a valid capability is stored in the associated capability sized block in response to execution of one or more specific instructions amongst a set of instructions that are executable by the apparatus. By restricting the setting of the valid capability indication field in this way, this can improve security, for example by inhibiting any attempt to indicate that a capability sized block of general purpose data within a vector register should be treated as a capability. Hence, operations performed on a vector that do not create a valid capability, either through a non-capability operation or through mutating a capability in a way that it ceases to be valid, can be arranged to cause the associated valid capability indication field to be cleared, hence indicating that a valid capability is not stored therein. Thus, by way of example, a partial write to a capability sized block of data, or a write of a non-capability, will clear the associated valid capability indication field. A capability indication field may also be cleared by various non-instruction operations, for example the stacking and clearing of vector register state associated with exception handling, or in some implementations a reset operation.

As mentioned earlier, the number of vector registers used to provide the required capabilities when executing the above-mentioned given vector memory access instruction is larger than the number of vector registers containing the data elements being subjected to the memory access operations. In one example implementation, the number of vector registers forming the plurality of vector registers determined from the at least one capability vector indication field is a power of two. In particular, the number of vector registers required to store the capabilities is dependent on the difference in size between the data elements and the capabilities, and in one example implementation that difference can vary by powers of two. It should be noted herein that when considering the size of a capability, any associated flag used to indicate that the capability is a valid capability (such as the earlier-mentioned valid capability indication field) is not considered to be part of the capability itself.

As mentioned earlier, if desired, multiple capability vector indication fields can be used to specify the various vector registers storing the capabilities required when executing the given vector memory access instruction. Such an approach allows the various vector registers to be arbitrarily located with respect to each other, and specified in the instruction encoding. However, in one example implementation, the at least one capability vector indication field is a single capability vector indication field arranged to identify one vector register and the instruction decoder is arranged to determine the remaining vector registers of the plurality of vector registers based on a determined relationship. Such an approach can be advantageous from an instruction encoding point of view, since typically instruction encoding space is quite limited, and it may not be practical to provide multiple capability vector indication fields to identify each of the vector registers that are to store the required capabilities.

The way in which the remaining vector registers are determined based on the identified one vector register and the determined relationship can take a variety of forms, dependent on implementation. For example, the determined relationship may specify that the vector registers are sequential to each other, that the vector registers are an even/odd pair, or that a known offset exists between the various vector registers. Alternatively, any other suitable indicated relationship may be used.

In one particular example implementation, the number of vector registers in the plurality of vector registers storing the required capabilities is $2^N$, and the single capability vector indication field is indicative of a first vector register number identifying the one vector register, where the first vector register number is constrained to have its N least significant bits at a logic zero value. The instruction decoder is then arranged to generate vector register numbers for each of the remaining vector registers by reusing the first vector register number and selectively setting at least one of the N least significant bits to a logic one value. This can provide a particularly simple and efficient mechanism for computing the various vector registers that will provide the capabilities required when executing the given vector memory access instruction.

In some implementations, the number of vector registers required to hold the capabilities will be fixed, for example due to the given vector memory access instruction only being supported for use with data elements of a particular fixed size, and where the capabilities are also of a fixed size. However, in a more general case, the number of vector registers can be inferred at runtime by the instruction decoder, based on knowledge of the size of the data elements upon which the given vector memory access instruction will be executed, and the size of the capabilities.

There are a number of ways in which the single capability vector indication field may be arranged to indicate the first vector register number. Whilst the single capability vector indication field may directly identify the first vector register number in one example implementation, in other implementations it may specify information sufficient to enable that first vector register number to be determined. For example, in the above case, where the first vector register number is constrained to have its N least significant bits at a logic zero value, those least significant N bits do not need identified within the single capability vector indication field, and instead can be hardwired to logic zero values.

The manner in which the capabilities associated with the various data elements are laid out within the vector registers used to provide the capabilities may vary dependent on implementation. However, in one example implementation, for any given pair of data elements associated with adjacent locations in the at least one vector register, the associated capabilities are stored in different vector registers of said plurality of vector registers. It has been found that such an arrangement can allow an efficient implementation when executing the given vector memory access instruction.

The way in which the location within the multiple vector registers of the associated capability for any particular data element is determined may vary dependent on implementation. However, in one example implementation the at least one vector register determined from the data vector indication field comprises a single vector register, and each data element is associated with a corresponding data lane of the single vector register. Further, each capability is located within a capability lane within one of the vector registers in said plurality of vector registers. It should be noted here that the width of the data lane will typically be different from the width of the capability lane, due to the fact that the data elements and capabilities are of a different size. With such an arrangement, then for a given data element the vector register within the plurality of vector registers containing the associated capability may be determined in dependence on a given number of least significant bits of a lane number of the corresponding data lane, and the capability lane containing the associated capability may be determined in dependence on the remaining bits of the lane number of the corresponding data lane. This hence provides a particularly efficient mechanism for determining the location of the associated capability for each data element.

In one particular example arrangement, the number of vector registers containing the plurality of capabilities is P, considered logically as a sequence with values 0 to P−1, and the number of capability lanes in any given vector register is M, with values from 0 to M−1. Further, the data lane associated with the given data element is data lane X, with values from 0 to X−1. Using such terminology, then in one example implementation the location of the associated capability within the plurality of vector registers may be determined by dividing X by P to produce a quotient and a remainder, where the quotient identifies the capability lane containing the associated capability, and the remainder identifies the vector register within the plurality of vector registers containing the associated capability. Hence, in such an implementation both the vector register and the capability lane needed to locate the associated capability for a given data element can be readily and efficiently determined.

It should be noted that whilst in the above example the plurality of vector registers containing the plurality of capabilities is considered logically as a sequence with values 0 to P−1, does not mean that the logical vector numbers associated with those vector registers need to be contiguous logical vector numbers, nor indeed does it mean that the vector registers have to be physically sequentially located with respect to each other within the set of vector registers.

In one example implementation, the set of vector registers may be logically partitioned into a plurality of sections, where each section contains a corresponding portion from each of the vector registers in the set of vector registers, and the plurality of capabilities may be located within the plurality of vector registers such that, for each data element, the associated capability is stored within the same section as that data element. By such an approach, this can allow execution of the given vector memory access instruction to be divided into multiple "beats", and during each beat only one section of the set of vector registers is accessed in order to execute the given vector memory access instruction. By allowing the vector memory access instruction to be divided into multiple beats, this can allow execution of the vector memory access instruction to be overlapped with execution of one or more other instructions, which can lead to a highly efficient implementation. In particular, since during any particular beat the data elements and capabilities required to perform the memory access operations during that beat can all be obtained from a single section of the set of vector registers, this leaves any other sections available for access during execution of an overlapped instruction.

In one example implementation, the processing circuitry may be arranged to perform, over one or more beats, the memory access operations for the data elements within a given section, before performing, over one or more beats, the memory access operations for the data elements within a next section. Whilst in one example implementation each beat amongst the multiple beats used to execute the given vector memory access instruction may access a different section, this is not a requirement and it may be the case in some implementations that more than one of those beats accesses the same section.

There are a number of ways in which the capabilities required when executing the above-mentioned given vector memory access instruction may be loaded from memory and then configured within the multiple vector registers in the arrangements discussed earlier, and indeed a number of ways in which those capabilities within the vector registers can be stored back to memory in due course. However, in one example implementation, the instruction decoder is arranged to decode a plurality of vector capability memory transfer instructions that together cause the instruction decoder to control the processing circuitry to transfer a plurality of capabilities between the memory and the plurality of vector registers, and to rearrange the plurality of capabilities during the transfer such that in memory the plurality of capabilities are sequentially stored and in the plurality of vector registers the plurality of capabilities are de-interleaved such that any given pair of capabilities within said plurality that are sequentially stored in the memory are stored in different vector registers of said plurality of vector registers.

It should be noted that the plurality of vector capability memory transfer instructions used to take the above steps do not need to directly follow each other, and hence do not need to be executed sequentially one after the other. Instead, there could be multiple, distinct, instructions that each perform part of the required work, and once all of the instructions have been executed then the required rearrangement of the capabilities as they are moved (in one example copied) between the memory and the vector registers will have been performed. The plurality of vector capability memory transfer instructions may be either load instructions used to load the capabilities from memory into the multiple vector registers, or store instructions used to store the capabilities from the multiple vector registers back to memory.

In one example implementation, each vector capability memory transfer instruction is arranged to identify different capabilities to each other vector capability memory transfer instruction, and each vector capability memory transfer instruction is arranged to identify an access pattern that causes the processing circuitry to transfer the identified capabilities whilst performing the rearrangement specified by the access pattern. Hence, in such an arrangement execution of each individual vector capability memory transfer instruction will cause the required rearrangement to be performed in respect of the capabilities being transferred by that instruction, with other vector capability memory transfer instructions then being used to transfer other capabilities and perform the required rearrangement for those capabilities.

With such an implementation, it is possible to arrange for the various different instructions to all transfer the same maximum amount of data, that maximum amount of data being selected having regard to the finite memory bandwidth available in any particular system. Such an approach can avoid any individual instruction from stalling and hence no sequencing state machine is required in order to implement such an approach. Such an approach also allows other instructions to be scheduled whilst this capability transfer process is ongoing. Further, by arranging each of the instructions to operate on different capabilities in the manner discussed above, any individual instruction can be arranged for each beat, to only operate within the same section of the vector registers. As discussed earlier, operating only within a given section allows overlapping of instructions that operate on different sections.

In one example implementation, the memory is formed of multiple memory banks and, for each vector capability memory transfer instruction, the access pattern is defined so as to cause more than one of the memory banks to be accessed when that vector capability memory transfer instruction is executed by the processing circuitry. Banked memory makes it easier for hardware to implement parallel transfers to/from memory, and hence specifying an access pattern that enables this is beneficial.

In addition to the vector capability memory transfer instructions mentioned above, vector load and store instructions can be used to load data elements from memory into the vector registers or store those data elements from the vector registers back to memory as and when required.

Whilst the number of vector registers used to hold the data elements and the number of vector registers used to hold the associated capabilities may vary dependent on implementation, in one particular example implementation the at least one vector register determined from the data vector indication field of the given vector memory access instruction comprises a single vector register, the capabilities are twice the size of the data elements (as mentioned earlier any flag used to indicate that the capability is a valid capability is not considered to be part of the capability when considering the size of the capability), and the plurality of vector registers determined from the at least one capability vector indication field comprise two vector registers. It has been found that such an arrangement provides a particularly useful implementation for performing vector gather and scatter operations using memory addresses derived from capabilities.

In one example implementation, the given vector memory access instruction may further comprise an immediate value indicative of an address offset, and the processing circuitry may be arranged to determine, for each given data element in the plurality of data elements, the memory address of the given data element by combining the address offset with the address indication provided by the associated capability. This can provide an efficient implementation for computing the memory addresses from the address indications provided in the various capabilities.

In one example implementation, the given vector memory access instruction may further comprise an immediate value indicative of an address offset, and, for each given data element, the processing circuitry may be arranged to update the address indication of the associated capability in the plurality of vector registers by adjusting the address indication in dependence on the address offset. Hence, by way of example, once the address indication in a particular capability has been used during execution of a first vector memory access instruction, that address indication as indicated within the capability stored in the vector register can be updated in the above manner so that it is ready to use in association with a subsequent vector memory access instruction.

In some instances, both of the above adjustment processes can be performed, such that the address offset is combined with (e.g. added to) the address indication provided by the capability in order to identify the memory address to access, and that same updated address is written back to the capability register as an updated address indication. Typically, the same immediate value will be used for both adjustment processes, but if desired different immediate values could be used for each adjustment process.

Particular example implementations will now be discussed with reference to the figures.

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example, the decoder 6 may interpret the opcodes of the decoded instructions and any additional control fields of the instructions to generate control signals which cause the processing circuitry 4 to activate appropriate hardware units to perform operations such as arithmetic operations, load/store operations or logical operations. The apparatus has a set of scalar registers 10 and a set of vector registers 12. It may also have other registers (not shown), for example for storing control information used to configure the operation of the processing circuitry. In response to arithmetic or logical instructions, the processing circuitry typically reads source operands from the registers 10, 12 and writes results of the instructions back to the registers 10, 12. In response to load/store instructions, data values are transferred between the registers 10, 12 and the memory system 8 via a load/store unit 18 within the processing circuitry 4. The memory system 8 may include one or more levels of cache as well as main memory.

The set of scalar registers 10 comprises a number of scalar registers for storing scalar values which comprise a single data element. Some instructions supported by the instruction decoder 6 and processing circuitry 4 may be scalar instructions which process scalar operands read from the scalar registers 10 to generate a scalar result written back to a scalar register.

The set of vector registers 12 includes a number of vector registers, each arranged to store a vector value comprising multiple elements. In response to a vector instruction, the instruction decoder 6 may control the processing circuitry 4 to perform a number of lanes of vector processing on respective elements of a vector operand read from one of the vector registers 12, to generate either a scalar result to be written to a scalar register 10 or a further vector result to be written to a vector register 12. Some vector instructions may generate a vector result from one or more scalar operands, or may perform an additional scalar operation on a scalar operand in the scalar register file as well as lanes of vector processing on vector operands read from the vector register file 12. Hence, some instructions may be mixed scalar-vector instructions for which at least one of the one or more source registers and a destination register of the instruction is a vector register 12 and another of the one or more source registers and the destination register is a scalar register 10.

Vector instructions may also include vector load/store instructions which cause data values to be transferred between the vector registers 12 and locations in the memory system 8. The load/store instructions may include contiguous load/store instructions for which the locations in memory correspond to a contiguous range of addresses, or gather/scatter type vector load/store instructions which specify a number of discrete addresses and control the processing circuitry 4 to load data from each of those addresses into respective elements of a vector register or to store data from respective elements of a vector register to the discrete addresses.

The processing circuitry 4 may support processing of vectors with a range of different data element sizes. For example, a 128-bit vector register 12 could be partitioned into sixteen 8-bit data elements, eight 16-bit data elements, four 32-bit data elements or two 64-bit data elements. A control register may be used to specify the current data element size being used, or alternatively this may be a parameter of a given vector instruction to be executed.

The processing circuitry 4 may include a number of distinct hardware blocks for processing different classes of instructions. For example, load/store instructions which interact with the memory system 8 may be processed by a dedicated load/store unit 18, whilst arithmetic or logical instructions could be processed by an arithmetic logic unit (ALU). The ALU itself may be further partitioned into a multiply-accumulate unit (MAC) for performing operations involving multiplication, and a further unit for processing other kinds of ALU operations. A floating-point unit can also be provided for handling floating-point instructions. Pure scalar instructions which do not involve any vector processing could also be handled by a separate hardware block compared to vector instructions, or re-use the same hardware blocks.

As discussed earlier, one type of vector load/store instruction that may be supported is a vector gather/scatter instruction. Such a vector instruction may indicate a number of discrete addresses in memory and control the processing circuitry 4 to load data from those discrete addresses into respective elements of a vector register (in the case of a vector gather instruction) or to store data from respective elements of a vector register to the discrete addresses (in the case of a vector scatter instruction). In accordance with the techniques described herein, rather than using a vector of standard address indications to identify the various memory addresses, a new form of vector gather/scatter instruction is provided that is able to specify vectors of capabilities to be used to determine the various memory addresses. This can provide a finer grain of control over the performance of the individual memory access operations used to implement a vector gather/scatter operation, since a separate capability can be defined for use in association with each of those individual memory access operations. In addition to providing an address indication, each capability will typically include constraining information that is used to restrict the operations that can be performed when using that capability. For example, the constraining information may identify a non-extendable range of memory addresses that are accessible by the processing circuitry when using the address indication provided by the capability, and may also provide one or more permission flags identifying associated permissions (for example whether read accesses are allowed, whether write accesses are allowed, whether accesses are allowed from a specified privilege or security level, whether the capability can be used to generate memory addresses of instructions to be fetched and executed, etc.).

When executing this new form of vector gather/scatter instruction, each data element to be moved between memory and a vector register (the direction of movement being dependent on whether a vector gather operation or a vector scatter operation is being performed) will have an associated capability, and capability access checking circuitry 16 within the processing circuitry 4 may be used to perform a capability check for each data element to determine whether the memory access operation to be used to access that given data element is allowed having regard to the constraining information specified by the associated capability. This may hence involve checking both whether the memory address is accessible given any range constraining information in the capability, and whether the type of access is allowed given the constraining information in the capability. More details as to how the plurality of capabilities required when executing such a vector gather/scatter instruction are arranged within a series of vector registers will be discussed in more detail with reference to a number of the remaining figures.

As shown in FIG. 1, beat control circuitry 20 can be provided if desired to control the operation of the instruction decoder 6 and the processing circuitry 4. In particular, in some example implementations the execution of a vector instruction may be divided into parts referred to as "beats", with each beat corresponding to processing of a portion of a vector of a predetermined size. As will be discussed in more detail later with reference to FIGS. 10 and 11, this can allow for overlapped execution of vector instructions, thereby improving performance.

Figure 2:
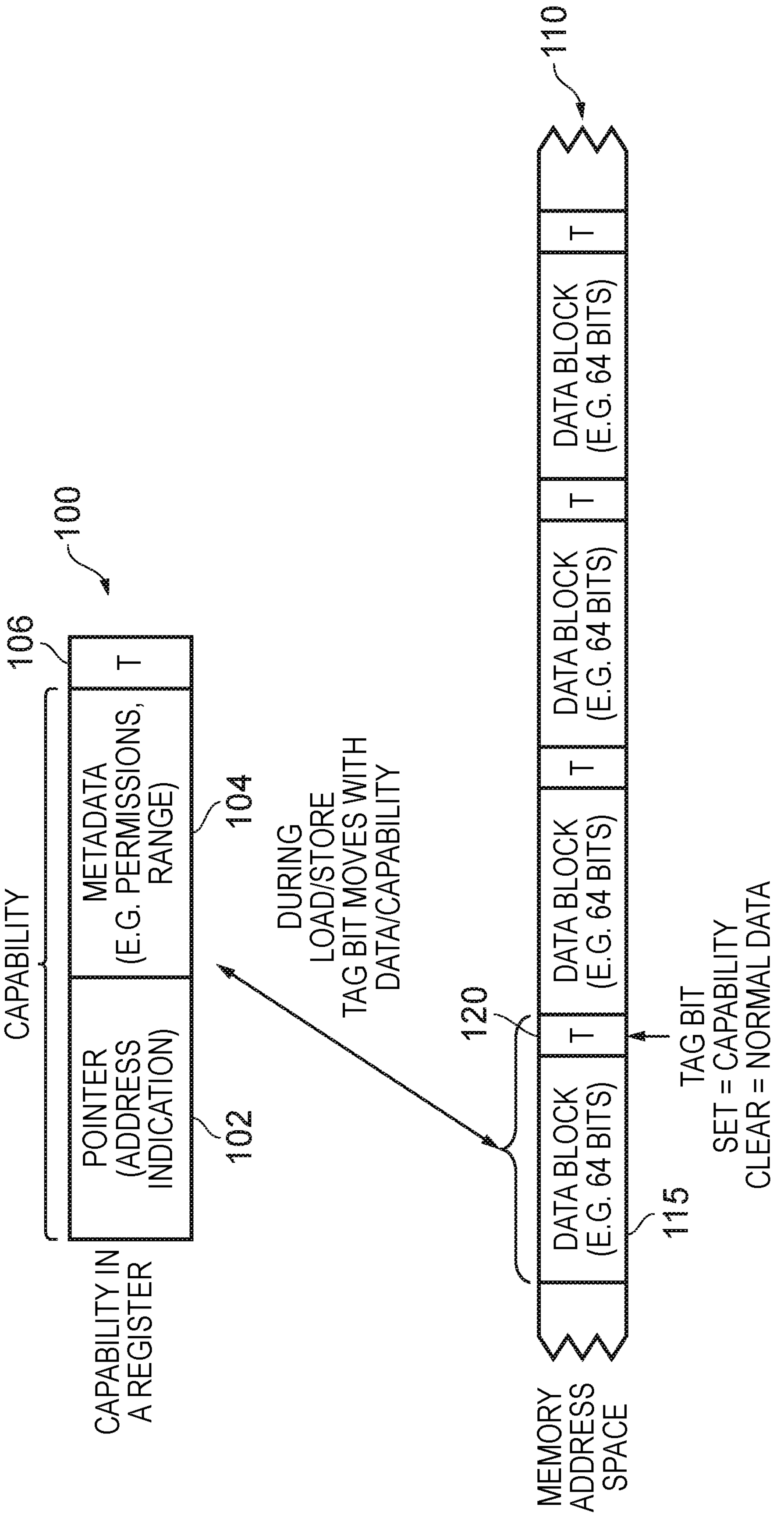
FIG. 2 illustrates the use of a tag bit in association with capabilities, in accordance with one example implementation.

FIG. 2 schematically illustrates how a tag bit may be used in association with individual data blocks to identify whether those data blocks represent a capability, or represent normal data. In particular, the memory address space 110 will store a series of data blocks 115, which typically will have a specified size. Purely for the sake of illustration, it is assumed in this example that each data block comprises 64 bits, but in other example implementations different sized data blocks may be used, for example 128-bit data blocks when capabilities are defined by 128 bits of information. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on example implementation, but purely by way of illustration, in one example implementation if the tag bit has a value of 1 it indicates that the associated data block is a capability, and if it has a value of 0 it indicates that the associated data block contains normal data. In one example implementation, the tag bits may not form part of the normal memory address space, and may instead be stored "out-of-band", for example in a distinct tag memory.

When a capability is loaded into a register 100 accessible to the processing circuitry, then the tag bit moves with the capability information. Accordingly, when a capability is loaded into the register 100, an address indication 102 (which may also be referred to herein as a pointer) and metadata 104 providing the constraining information (such as the earlier-mentioned range information and permissions information) will be loaded into the register. In addition, in association with that register, or as a specific bit field within it, the tag bit 106 will be set to identify that the contents represent a valid capability. Similarly, when a valid capability is stored back out to memory, the relevant tag bit 120 will be set in association with the data block in which the capability is stored. By such an approach, it is possible to distinguish between a capability and normal data, and hence ensure that normal data cannot be used as a capability.

The apparatus may be provided with dedicated capability registers for storing capabilities (not shown in FIG. 1), and hence the register 100 in FIG. 2 may be a dedicated capability register. However, for the purposes of executing the above-mentioned new form of vector gather/scatter instructions, it is desirable to place the required capabilities within a number of vector registers within the set of vector registers 12. To enable a distinction to be made between valid capabilities stored within a vector register and general purpose data, the set of vector registers is supplemented by the provision of an associated valid capability indication storage, and two different ways in which this may be implemented are shown schematically in FIGS. 3A and 3B. In the example shown in FIG. 3A a set of vector registers 130 comprises a plurality of vector registers 135, where each vector register is of a size sufficient to provide a number of capability sized blocks 137. Purely by way of example, when the capability is 64 bits in length, each capability sized block 137 may be 64 bits, and the length of each vector register may be $2^N$ times 64 bits, where N is an integer of 0 or more.

Figure 3A:
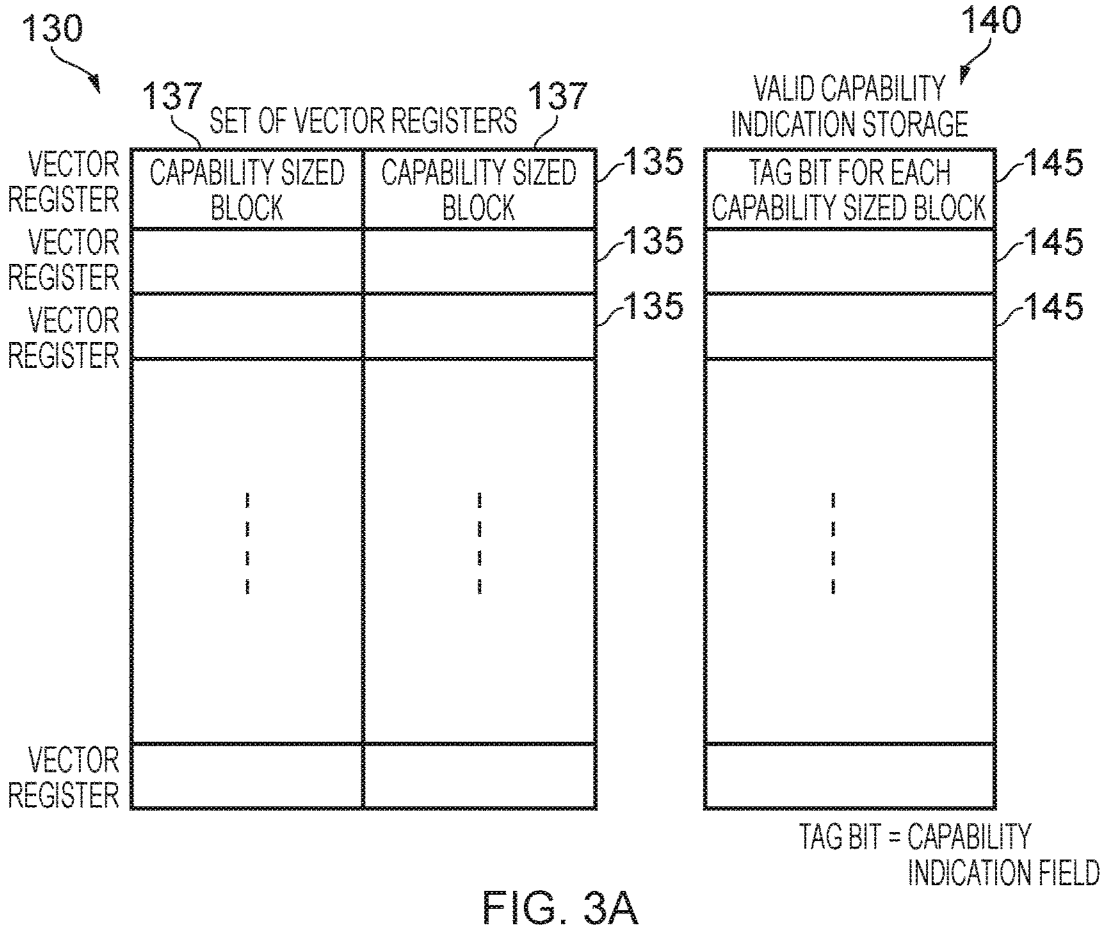
FIGS. 3A and 3B illustrate different ways in which valid capability indications (which in one example take the form of tag bits) may be stored in association with each capability sized block of a vector register to indicate whether that capability sized block stores a valid capability, in accordance with one example implementation.

In the specific example of FIG. 3A it is assumed that each vector register is 128 bits in length, and hence each vector register has two capability sized blocks 137. A valid capability indication storage 140 is provided in association with the set of vector registers, the valid capability indication storage 140 having an entry 145 for each vector register 135. Each entry 145 provides a valid capability indication field for each capability sized block 137 in the associated vector register 135. The valid capability indication field can take a variety of forms, but in one example implementation could be a single bit field, and hence can in one example take the form of the earlier described tag bit. In such cases, it will be appreciated that each entry 145 provides a tag bit for each capability sized block 137 in the associated vector register 135, to identify whether that capability sized block is storing a valid capability or not.

Figure 3B:
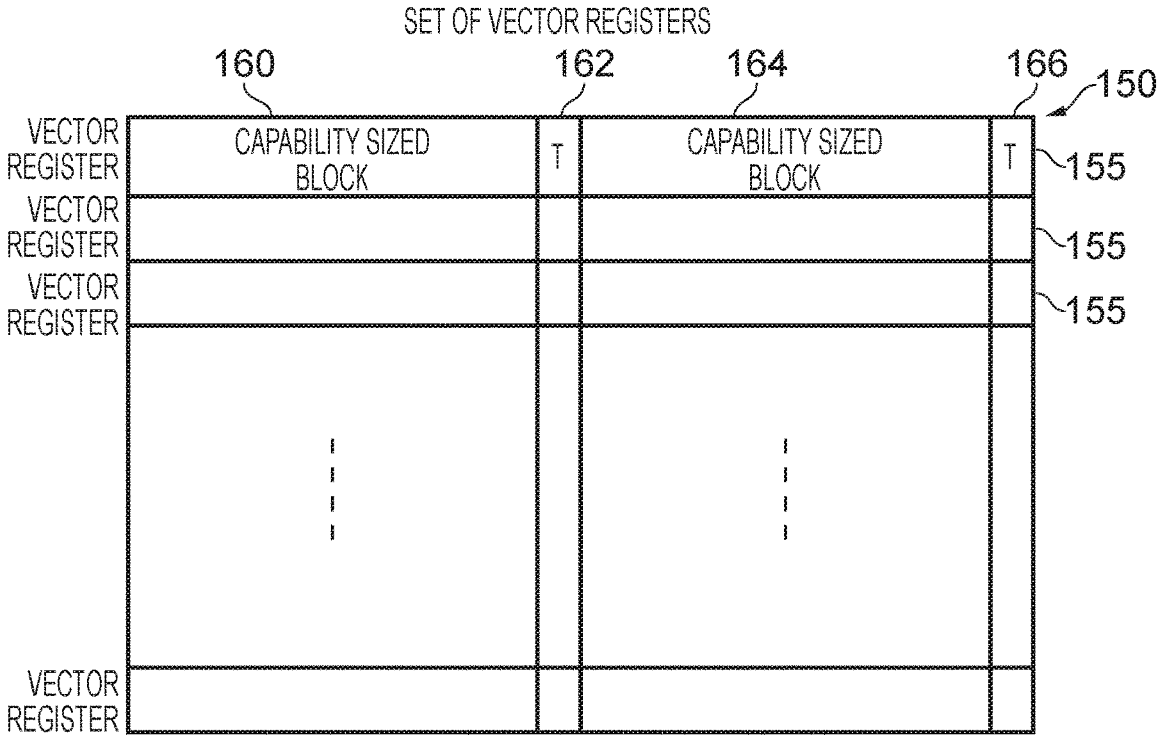

Whilst in the example of FIG. 3A the valid capability indication storage 140 is considered to be a separate structure to the set of vector registers 130, in an alternative implementation the valid capability indication storage can effectively be incorporated within the set of vector registers by increasing the size of the vector registers to accommodate the necessary tag bits. Such an arrangement as shown in FIG. 3B, where the set of vector registers 150 includes a number of capability sized blocks 160, 164, each of which has an associated valid capability indication field 162, 166 to store the associated tag bit. It should be noted that in this arrangement the size of the capability is not considered to change, and hence in the earlier-mentioned example each capability is still 64 bits in length. However, the vector registers are extended to provide space for the associated tag bits. Hence, considering the example of FIG. 3B, where again it is considered that two capabilities may be stored within each vector register, and assuming each capability is 64 bits in length, any vector register that is able to store capabilities may be arranged to be 130 bits in length, so as to enable both two capabilities and their associated tag bits to be stored. Although in this example the tag bits are part of the vector registers 155, access to the tag bits may still be tightly controlled, as described earlier, so that they are not directly accessible to general purpose processing instructions, and mutating the values in a vector register using a non-capability instruction results in the tag being cleared.

It should be noted that whilst in the examples of FIGS. 3A and 3B it is assumed that all of the vector registers are capable of storing capabilities, in an alternative implementation a subset of the vector registers in the set may be reserved for storing capabilities, and in such case it is only that subset of vector registers that needs to be provided with associated valid capability indication storage, whether as a discrete storage (as per the example of FIG. 3A) or incorporated within the vector register structure itself (as per the example of FIG. 3B).

Figure 4A:
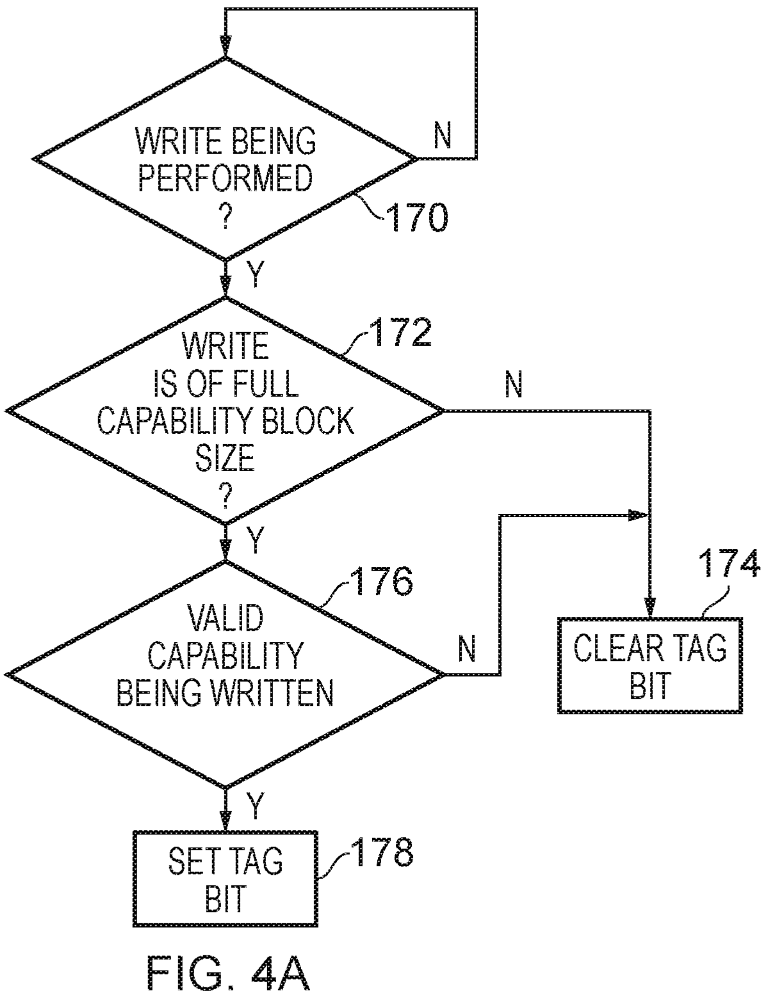
FIGS. 4A and 4B are flow diagrams illustrating how the tag bits maintained in association with each capability sized block of a vector register may be managed, in accordance with one example implementation.
Figure 4B:
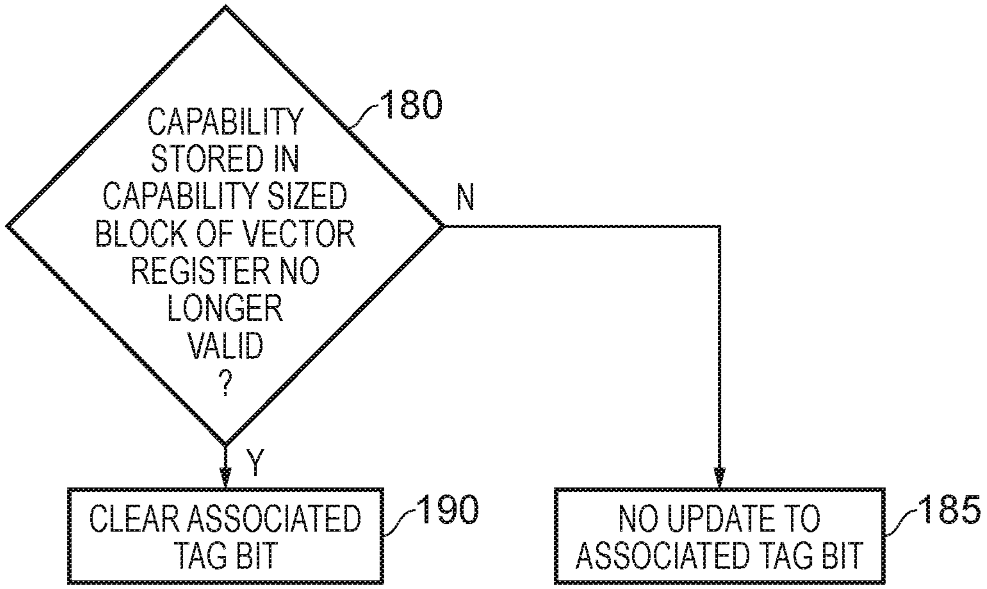

FIGS. 4A and 4B are flow diagrams illustrating how the tag bits maintained in association with each capability sized block of a vector register may be managed in accordance with one example implementation. FIG. 4A illustrates some steps performed to decide what action to take in relation to the associated tag bit maintained for a capability sized block within a vector register that is being written to. In particular, if at step 170 it is determined that a write operation is being performed to a vector register then the remainder of the process of FIG. 4A is performed in relation to each capability sized block within that vector register that is being written to.

At step 172, it is determined whether the data being written in respect of a given capability sized portion of a vector register is of a full capability block size. If not, then the tag bit is cleared if it was previously set, and accordingly the process proceeds to step 174 where the tag bit is cleared. Such an approach prevents illegal modification of a capability. For example, if an attempt is made to modify a certain number of bits of a valid capability stored within a vector register, then the above process will cause the tag bit to be cleared, preventing the modified version now stored in the vector register from being used as a capability.

However, assuming a full capability sized block of information is being written into the given capability sized portion of the vector register, then it is determined at step 176 whether a valid capability is being written. If not, then again the process proceeds to step 174 where the tag bit is cleared. However, if a valid capability is being written, then the process proceeds to step 178 where the tag bit is set.

It should be noted that it is not just during the execution of instructions that write to the vector registers that a tag bit associated with a capability sized block within a vector register may be cleared. In particular, as indicated by FIG. 4B, it can be determined at step 180 whether any steps have been taken to cause a capability stored in a capability sized block of a vector register to be no longer valid. In the absence of such a condition being detected, then as indicated by step 185 no update to the associated tag bit is made, but whenever that condition is detected then the associated tag bit is cleared at step 190.

Figure 5A:
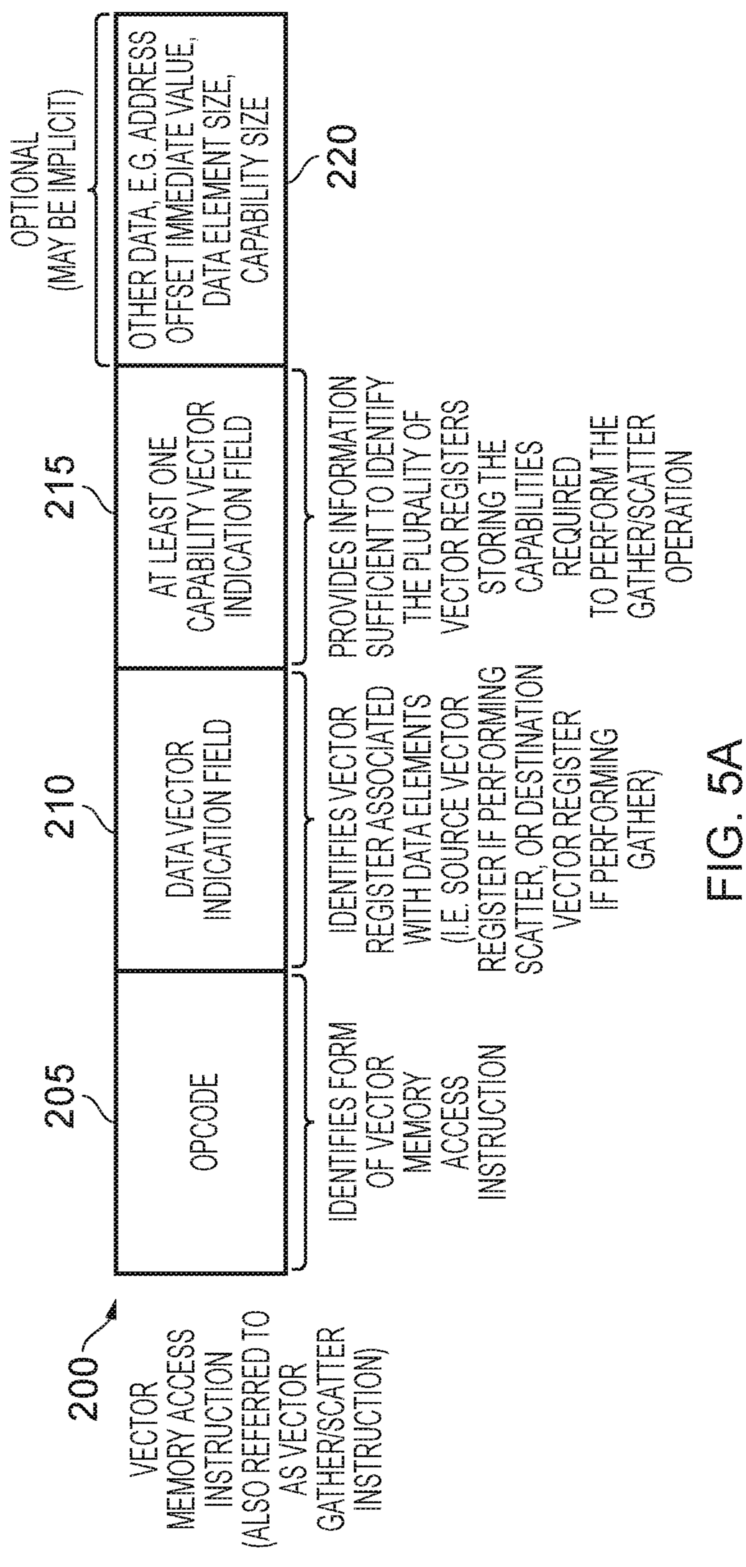
FIG. 5A illustrates fields that may be provided within a vector memory access instruction in accordance with one example implementation, whilst

FIG. 5A schematically illustrates fields that may be provided within a vector memory access instruction 200 (also referred to herein as a vector gather or vector scatter instruction) in accordance with one example implementation. An opcode field 205 is used to identify the form of the vector memory access instruction, and hence in this instance may be used to identify whether the gather variant or scatter variant is being specified, and to identify that the instruction is of the earlier described type that uses capabilities to determine the memory addresses to be accessed.

A data vector indication field 210 is used to identify at least one vector register that is to be associated with the data elements that will be moved between the vector register set and memory through execution of the instruction. In one example implementation, a single vector register is identified by the data vector indication field 210. It will be appreciated that such an identified vector register will act as a source vector register when performing a vector scatter operation, or will act as a destination vector register when performing a vector gather operation.

At least one capability vector indication field 215 may also be provided whose contents are used to identify the plurality of vector registers storing the capabilities required to determine the memory addresses of each of the data elements to be subjected to the vector scatter or vector gather operation. Whilst in one implementation multiple capability vector indication fields may be provided, for example one field for each of the vector registers containing the required capabilities, in another example implementation a single capability vector indication field is used to provide sufficient information to determine one of the vector registers storing the capabilities, with the other vector registers then being determined based on some predetermined relationship. This latter approach can be advantageous from an instruction encoding point of view. The predetermined relationship can take a variety of forms. For example, the vector registers may be sequential to each other, may form an even/odd pair, or a known offset may exist between the various vector registers.

As shown in FIG. 5A, the instruction 200 may also include one or more optional fields 220 to capture additional information. For instance, an immediate value indicative of an address offset may be specified that can be used in a variety of ways. For example, that address offset may be combined with (e.g. added to) the address indication in each capability to identify the memory address to be accessed. As another example, the address offset may be used to update the address indication in each capability (again for example by combining the address offset with the existing address indication) so that the updated capability in the vector registers is then ready to be used in connection with a subsequent vector memory access instruction. Indeed, in one example implementation both of the above address indication adjustment processes may be performed, and the same immediate value will typically be used for both adjustment processes.

As another example of optional information that may be provided within one or more fields 220, information may be provided to specify the data element size of the data elements to be accessed during execution of the instruction, and/or the capability size. In some implementations this information may be unnecessary, since the capability size may be fixed, and also it may be the case that the vector memory access instructions of the type described herein are only allowed to be performed on data elements of a specific size, and hence in that example instance both the data element size and the capability size are known without needing to be specified separately by the instruction.

It should be noted that whilst in FIG. 5A the various bits forming each field are shown as contiguous, this is purely for the sake of illustration and exactly which bits within an instruction are associated with which fields will vary dependent on implementation. Purely by way of example, if a vector register identifier field is four bits wide, it may be that three bits are grouped together, but the fourth bit is provided somewhere else within the instruction encoding.

Figure 5B:
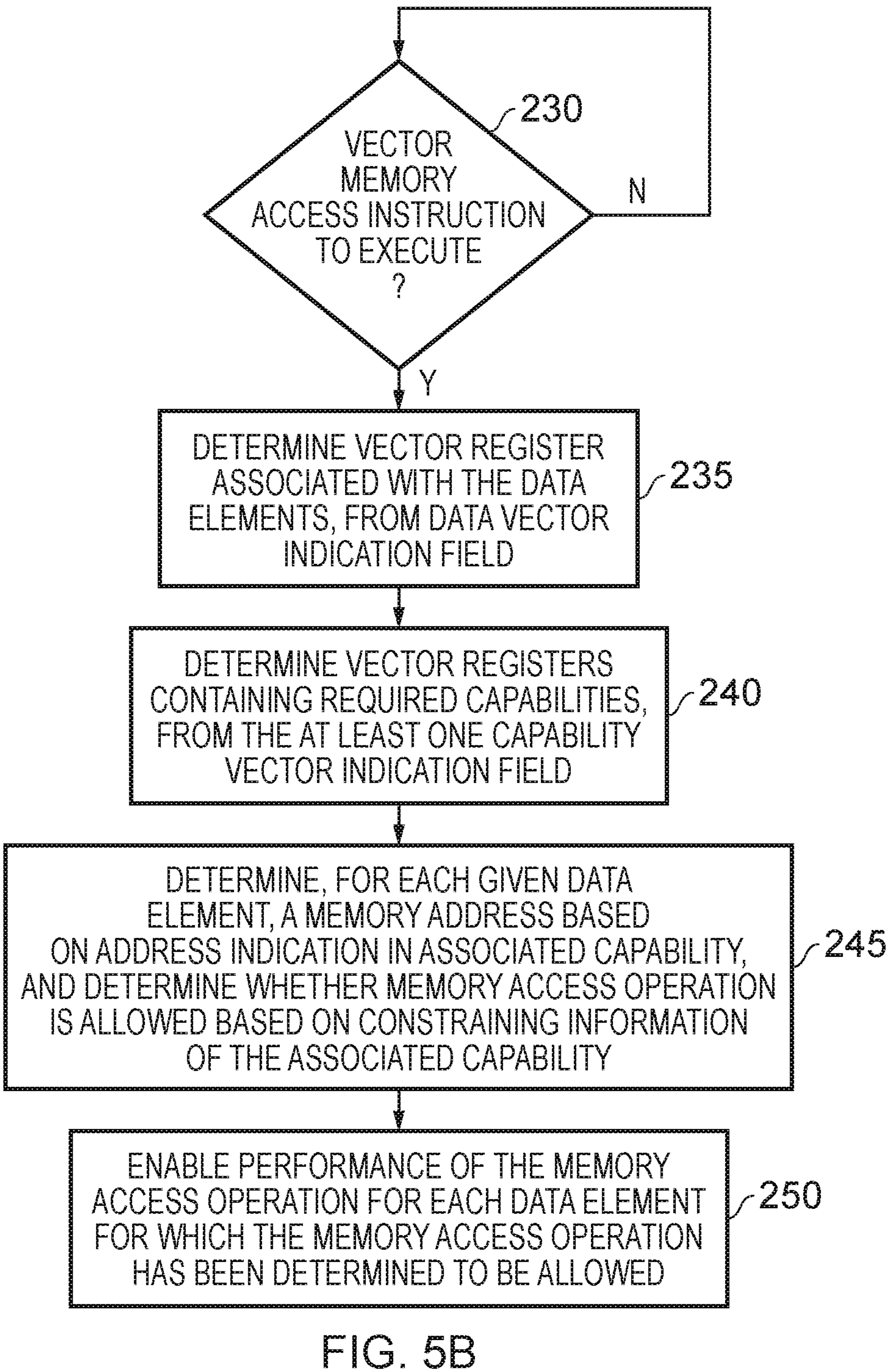
FIG. 5B is a flow diagram illustrating the steps performed when executing such a vector memory access instruction in accordance with one example implementation.

FIG. 5B is a flow diagram illustrating steps performed when executing a vector memory access instruction such as that shown in FIG. 5A. At step 230, it is determined whether a vector memory access instruction is to be executed, and if so the process proceeds to step 235 where a vector register associated with the data elements is determined from the information in the data vector indication field.

At step 240, the multiple vector registers containing the required capabilities are also determined, using the information in the at least one capability vector indication field. As discussed earlier, multiple capability vector indication fields can be provided, each for example identifying one of the vector registers, or alternatively a single capability vector indication field may be provided to enable determination of one of the vector registers, with the other vector registers then being determined having regard to a known relationship.

At step 245, for each given data element that the vector memory access instruction relates to, a memory address is determined for that given data element based on the address indication provided by the associated capability. In addition, it is determined whether the memory access operation to be used to access that given data element is allowed based on the constraining information of the associated capability. This may involve not only determining whether the memory address is within the allowed range specified by range constraining information in the associated capability, but also whether any other constraints specified by the metadata of the associated capability are met (for example whether a write access is allowed using the associated capability in the event that a vector scatter operation is being performed, and hence the individual memory access operation being performed for the given data element is a write operation).

At step 250, performance of the memory access operation can be enabled for each data element for which the memory access operation has been determined to be allowed. Whilst in one example implementation the memory access operations may be performed for each data element for which those memory access operations are allowed, in other implementations it may be decided to suppress performance of one or more allowed memory access operations in instances where another of the memory access operations is not allowed. As mentioned earlier, exactly which allowable accesses get suppressed in such a situation may depend on the implementation, and where in the vector of data elements the data element whose associated access is not allowed is.

Figure 6A:
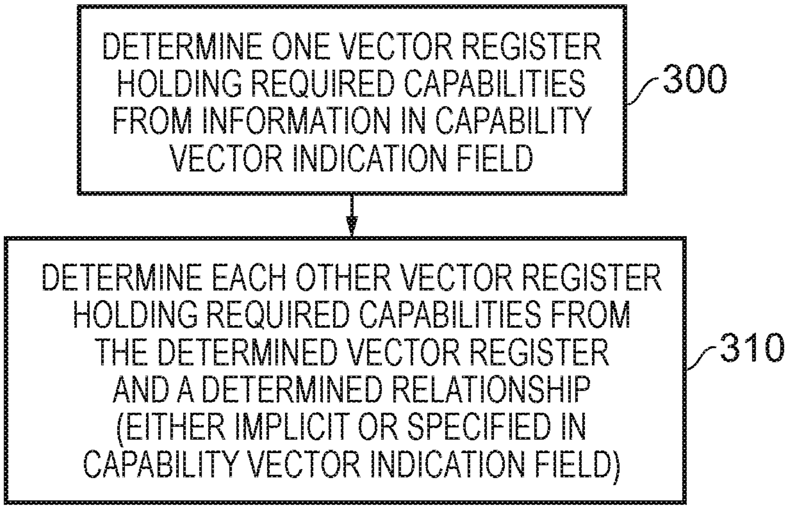
FIGS. 6A and 6B are flow diagrams illustrating techniques that can be used to determine the multiple vector registers that hold the required capabilities used when performing gather and scatter operations, in accordance with one example implementation.

FIG. 6A is a flow diagram illustrating a technique that can be used to determine the multiple vector registers that hold the required capabilities, in an implementation where a single capability vector indication field is provided. At step 300, one vector register holding required capabilities is determined from the information in that single capability vector indication field. Then, at step 310, each other vector register holding required capabilities is determined from the vector register identified at step 300 and a known determined relationship. That determined relationship may be either implicit, or could alternatively be specified within the capability vector indication field, or indeed within another field of the instruction.

Figure 6B:
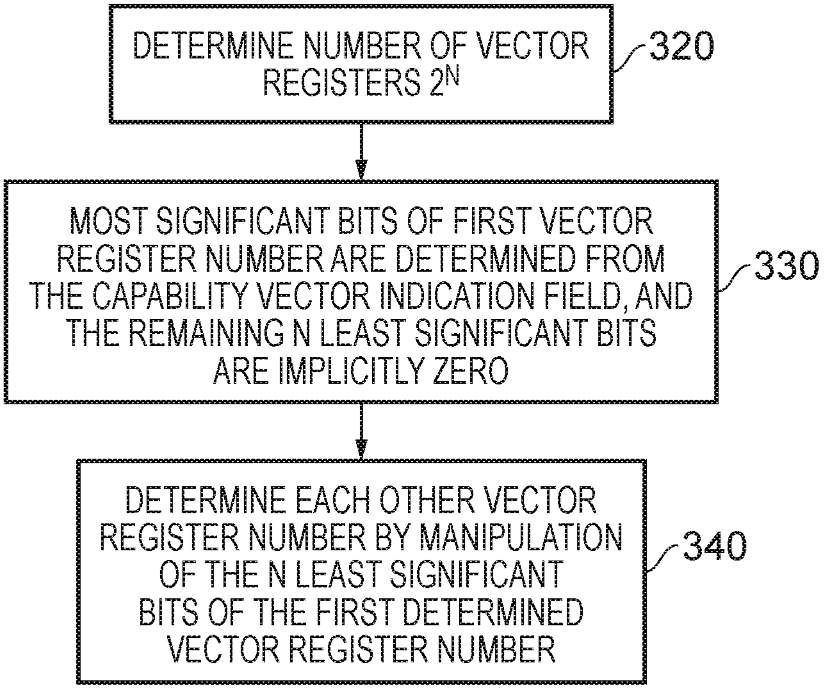

FIG. 6B illustrates a particular example implementation that may be used for computing the various vector registers that hold the required capabilities. At step 320 the number of vector registers containing the required capabilities is determined, in this example implementation there being $2^N$ such vector registers. In some implementations, the number of vector registers required to hold the capabilities will be fixed, for example due to the given vector memory access instruction only being supported for use with data elements of a particular fixed size, and where the capability is also of a fixed size. However, alternatively the number of vector registers could be determined at runtime by the instruction decoder, for example based on data element size and capability size information specified by the instruction.

At step 330, a first vector register number is determined from the information provided in the capability vector indication field, but in this implementation the least significant N bits of that vector register number are constrained to be logic zero values. In such an implementation, it will be appreciated that the capability vector indication field does not need to specify those bits, since they can be hardwired to 0.

At step 340, each other vector register number for the multiple vector registers containing the required capabilities is determined by manipulation of the N least significant bits of the first determined vector register number. This provides a particularly simple and efficient mechanism for specifying the multiple vector registers containing the required capabilities.

Figure 7:
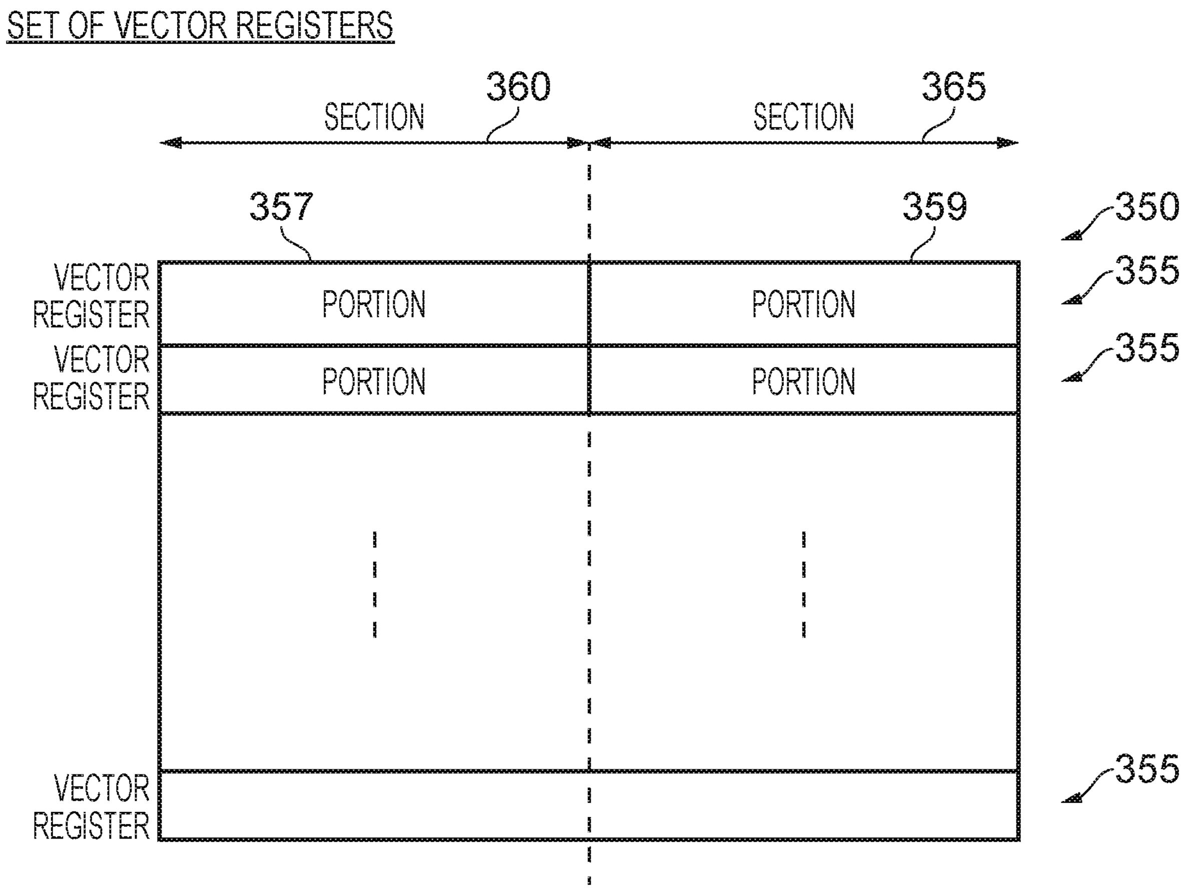
FIG. 7 schematically illustrates how a set of vector registers may be logically partitioned into multiple sections, in accordance with one example implementation.

FIG. 7 illustrates how the set of vector registers 350 may be considered to be formed of multiple logical sections 360, 365. Each vector register 355 has a portion 357, 359 within each of the sections. Whilst in FIG. 7 two sections are shown, in other implementations more than two sections may be provided. In some implementations only a single capability will be provided per portion 357, 359 of a vector register, whereas in other implementations each portion of a register may my large enough to hold multiple capabilities. By such an approach, this can allow execution of vector instructions, including the given vector memory access instruction, to be divided into multiple "beats", and during each beat only one section of the set of vector registers is accessed in order to execute a vector instruction. By allowing the vector instruction to be divided into multiple beats, this can allow execution of the vector instruction to be overlapped with execution of one or more other vector instructions, which can lead to a highly efficient implementation. For example, the given vector memory access instruction may be overlapped with a vector arithmetic instruction. In particular, in one example implementation the data elements and capabilities required to perform the memory access operations during any particular beat can all be obtained from a single section of the set of vector registers, and this then leaves any other sections available for access during execution of an overlapped instruction.

Figure 10:
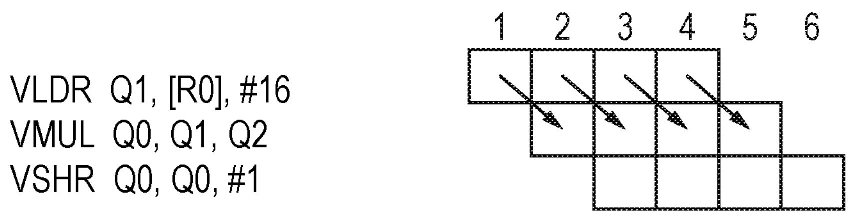
FIG. 10 shows an example of overlapped execution of vector instructions.

More details of a beat-based implementation will be discussed in more detail later with reference to FIGS. 10 and 11.

Figure 8A:
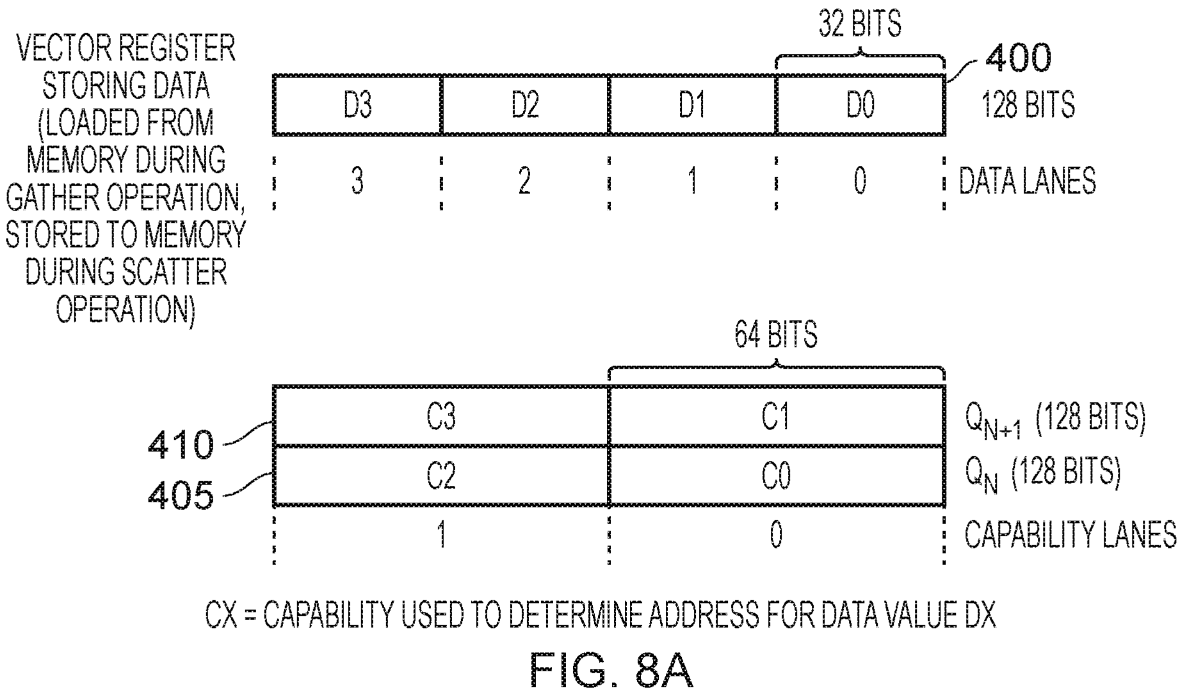
FIGS. 8A to 8C illustrate specific example arrangements of data elements and associated capabilities that may be used when performing gather or scatter operations of the type described herein.
Figure 8B:
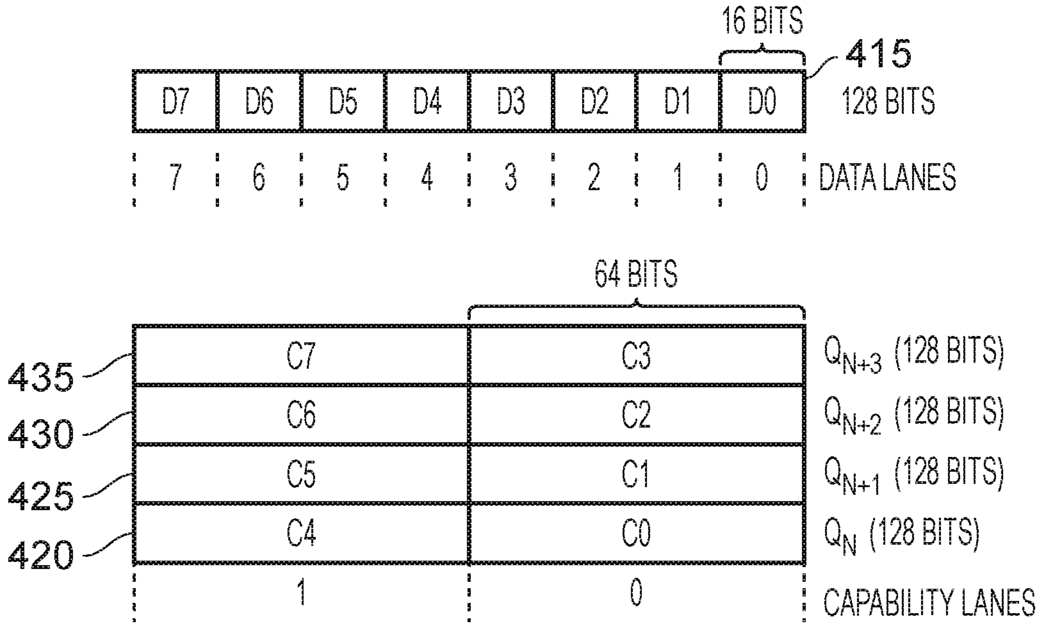
Figure 8C:
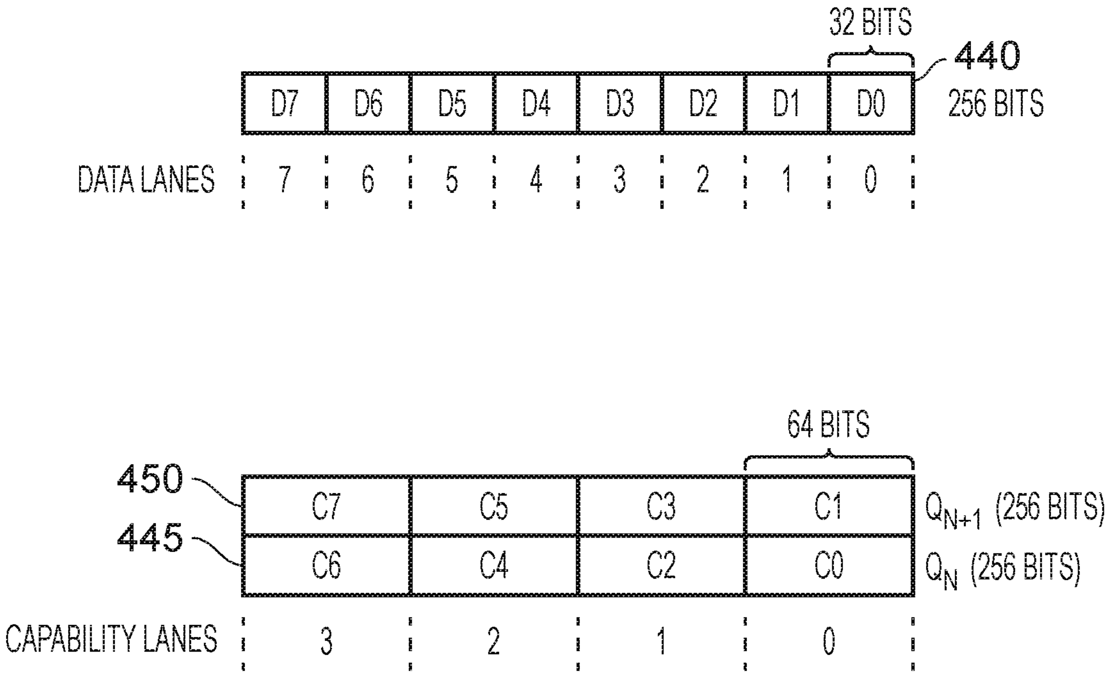

FIGS. 8A to 8C illustrate different specific example arrangements of data elements and associated capabilities that may be used when performing the gather or scatter operations described herein. As noted in FIG. 8A, the terminology "CX" identifies the capability used to determine the memory address for a corresponding data value "DX". The vector register 400 shown in FIG. 8A is the vector register associated with the data elements being accessed during execution of the vector memory access instruction. In this example implementation it is assumed that the vector register 400 is 128 bits wide, and each data element is 32 bits wide, and as a result four data elements are associated with the vector register 400. Each data element can be viewed as being associated with a corresponding data lane of the vector register 400, and as shown in FIG. 8A the data lanes can hence take the values 0 to 3.

In the examples shown in FIGS. 8A to 8C, the capabilities are 64 bits wide, and hence each vector register 405, 410 in the example of FIG. 8A can store two capabilities (for the purposes of illustration in FIGS. 8A to 8C, any additional bits provided to hold the earlier discussed tag values are omitted). Each capability within a particular vector register can be viewed as occupying an associated capability lane, and hence in the example of FIG. 8A there are two capability lanes referred to as lanes 0 and 1. As shown in FIG. 8A, capability C0 occupies capability lane 0 within a first capability register $Q_N$ 405, capability C1 occupies capability lane 0 within a second capability register $Q_{N+1}$ 410, capability C2 occupies capability lane 1 within the first capability register $Q_N$ 405, and capability C3 occupies capability lane 1 within the second capability register $Q_{N+1}$ 410. Hence, it can be recognised that by such an arrangement, for any given pair of data elements associated with adjacent locations in the vector register 400, the associated capabilities are stored in different vector registers amongst the plurality of vector registers 405, 410.

Such an arrangement has been found to be highly advantageous, as it means that the capabilities required in association with a particular sequence of data elements can all be found within the same portion 357, 359 of the vector registers. In particular, in the example shown in FIG. 8A, the data elements DO and D1 and the capabilities C0 and C1 required for identifying the memory addresses of those data elements can all be found in the lower half of the relevant vector registers, and similarly the data elements D2 and D3 and the capabilities C2 and C3 required for identifying the memory addresses of those data elements can all be found in the upper half of the relevant vector registers. This can for example support beat wise execution of the vector memory access instruction as referred to earlier.

Whilst in FIG. 8A the data values are 32 bits, this is not a requirement, and FIG. 8B shows an alternative example where the data elements are 16 bits wide. Hence, the 128-bit wide vector register 415 can be associated with eight data elements, and four vector registers $Q_N$ to $Q_{N+3}$ 420, 425, 430, 435 are required to hold the associated capabilities. Again, the capabilities are laid out in an analogous manner to that in FIG. 8A, with the first four capabilities being stored within the lower halves of the vector registers 420, 425, 430, 435 and the final four capabilities being stored within the upper halves of those vector registers.

It is also not a requirement that the vector registers be considered to be 128-bit registers, and in the example of FIG. 8C each of the registers is 256 bits wide. In this particular example, the data elements are 32 bits wide and the capabilities remain the same as in the other examples, i.e. are 64 bits wide. In this example, it can be seen that there are hence eight data elements associated with the vector register 440, and that two vector registers 445, 450 are used to store the eight capabilities, with four capabilities being placed within each register. The capabilities are arranged so that they are stored in ascending order in capability lane 0, capability lane 1, capability lane 2 and capability lane 3, hence following the general pattern discussed earlier with reference to the other two examples of FIGS. 8A and 8B.

When performing the earlier described beat wise execution of a vector memory access instruction, then in one example implementation each section of the vector register may be arranged to store one or more capabilities. Hence, considering the examples of FIG. 8A or FIG. 8B, the vector registers may be considered to be formed of two sections, allowing half of the required access operations to be processed in the first beat and the remaining half in the second beat. Similarly, considering FIG. 8C, the vector register set may be considered to be formed of two or four sections, allowing the required access operations to be performed over two or four beats, respectively. However, it should be noted that it is not necessarily a requirement that each logical section of a vector register is wide enough to accommodate at least one capability. For example, in some implementations it may be possible to have a section size that is smaller than the capability size, for example a 32-bit section size, with 64-bit capabilities.

Figure 9:
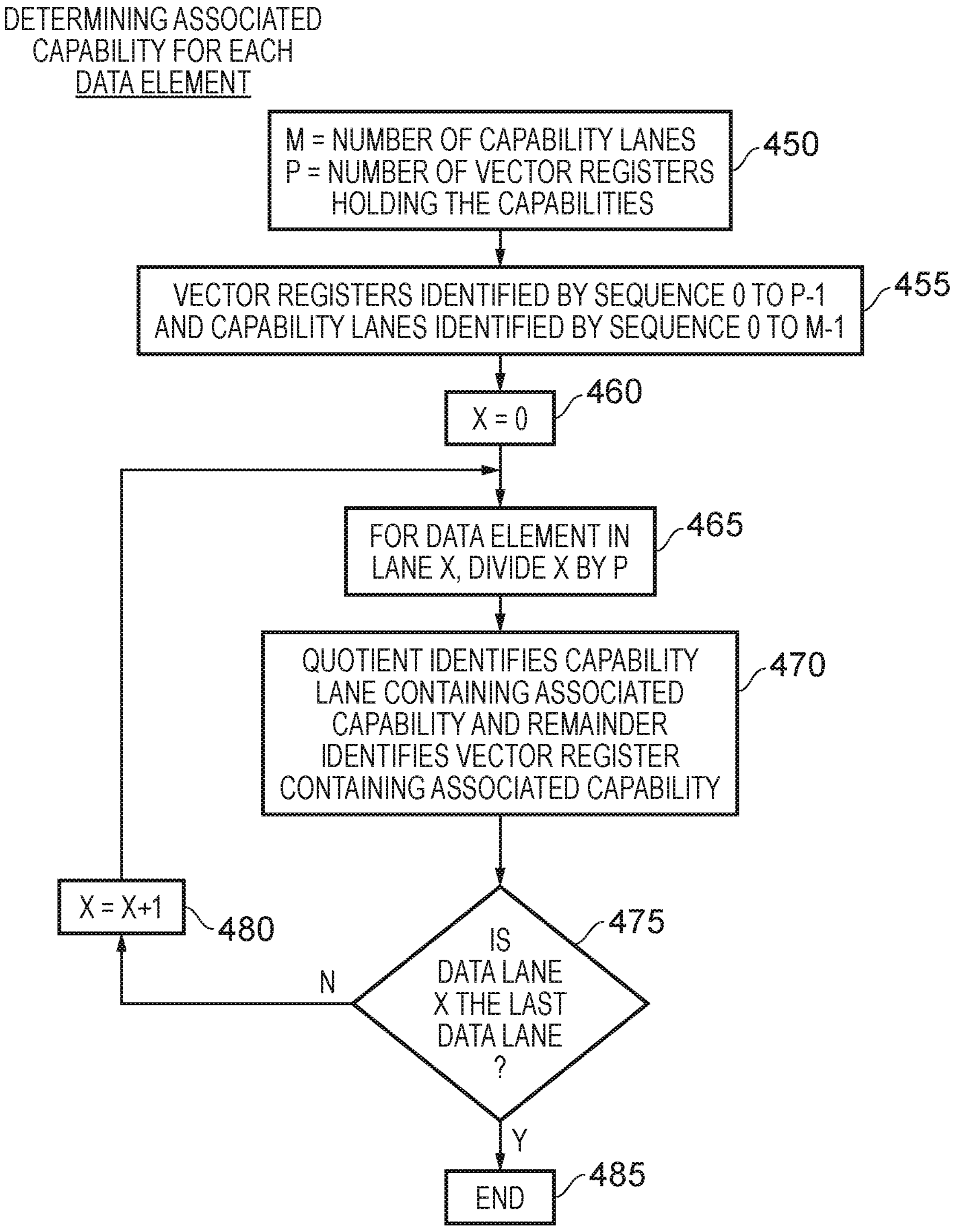
FIG. 9 is a flow diagram illustrating how the associated capability for each data element may be determined, in accordance with one example implementation.

FIG. 9 is a flow diagram illustrating how the associated capability for each data element can be determined, when using the layout of capabilities as illustrated schematically in FIGS. 8A to 8C. At step 450, a parameter M is set equal to the number of capability lanes, and a parameter P is set equal to the number of vector registers holding the capabilities. At step 455, the vector registers are considered to be identified by the sequence of values 0 to P−1 and the capability lanes are considered to be identified by the sequence of values 0 to M−1. At step 460, a parameter X is set to 0, and then at step 465, for the data element in lane X, a computation X/P is performed.

At step 470, the quotient and the remainder resulting from the above computation are used to identify the capability lane and vector register, respectively, containing the associated capability. At step 475, it is determined whether data lane X is the last data lane, and if not the value of X is incremented at step 480 before returning to step 465. Once at step 475 it is determined that data lane X is the last data lane, then the process ends at step 485.

In some applications such as digital signal processing (DSP), there may be a roughly equal number of ALU and load/store instructions and therefore some large blocks such as the MACs can be left idle for a significant amount of the time. This inefficiency can be exacerbated on vector architectures as the execution resources are scaled with the number of vector lanes to gain higher performance. On smaller processors (e.g. single issue, in-order cores) the area overhead of a fully scaled out vector pipeline can be prohibitive. One approach to minimise the area impact whilst making better usage of the available execution resource is to overlap the execution of instructions, as shown in FIG. 10. In this example, three vector instructions include a load instruction VLDR, a multiply instruction VMUL and a shift instruction VSHR, and all these instructions can be executing at the same time, even though there are data dependencies between them. This is because element 1 of the VMUL is only dependent on element 1 of Q1, and not the whole of the Q1 register, so execution of the VMUL can start before execution of the VLDR has finished. By allowing the instructions to overlap, expensive blocks like multipliers can be kept active more of the time.

Hence, it can be desirable to enable micro-architectural implementations to overlap execution of vector instructions. However, if the architecture assumes that there is a fixed amount of instruction overlap, then while this may provide high efficiency if the micro-architectural implementation actually matches the amount of instruction overlap assumed by architecture, it can cause problems if scaled to different micro-architectures which use a different overlap or do not overlap at all.

Figure 11:
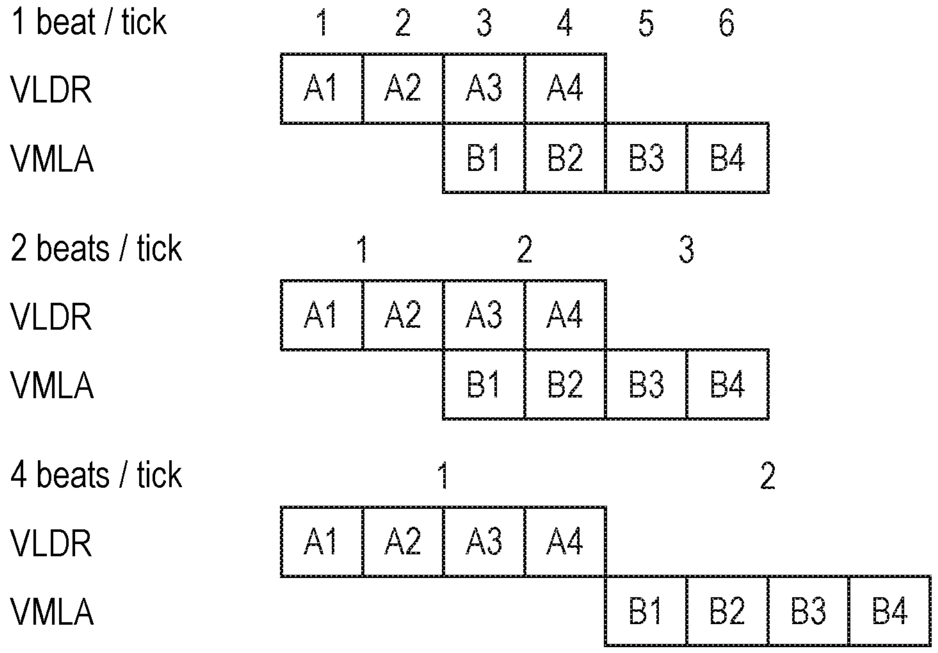
FIG. 11 shows three examples of scaling the amount of overlap between successive vector instructions between different processor implementations or at run time between different instances of execution of the instructions.

Instead, an architecture may support a range of different overlaps as shown in examples of FIG. 11. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat is defined by the architecture and can be an arbitrary fraction of the vector. In the examples of FIG. 11 a beat is defined as the processing corresponding to one quarter of the vector width, so that there are four beats per vector instruction. Clearly, this is just one example and other architectures may use different numbers of beats, e.g. two or eight. The portion of the vector corresponding to one beat can be the same size, larger or smaller than the data element size of the vector being processed. Hence, even if the element size varies from implementation to implementation or at run time between different instructions, a beat is a certain fixed width of the vector processing. If the portion of the vector being processed in one beat includes multiple data elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form a data element.

As shown in FIG. 11 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However, such micro-architecture techniques are not visible to the software as a tick is atomic at the architecture level. For conciseness such micro-architecture is ignored during further description of this disclosure.

As shown in the lower example of FIG. 11, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 11, instruction execution can be overlapped with the first and second beats of a second vector instruction carried out in parallel with the third or fourth beats of a first instruction, where those instructions are executed on different execution units within the processing circuitry (e.g. in FIG. 11 the first instruction is a load instruction executed using the load/store unit 18 (and may for example be a vector gather instruction of the type described herein) and the second instruction is a multiply accumulate instruction executed using a MAC unit provided within the processing circuitry 4).

A yet more energy/area-efficient implementation may provide hardware units which are narrower and can only process a single beat at a time, and in this case one beat may be processed per tick, with the instruction execution overlapped and staggered by two beats as shown in the top example of FIG. 11. In one example implementation, the section size may be used to influence the amount of staggering between instructions (because when executing a particular beat it is desired to obtain all of the data from the same section). In the top example illustrated in FIG. 11, it may for example be the case that the beat size is 32 bits, but the section size is 64 bits, and this is hence why the instructions are staggered by two beats.

It will be appreciated that the overlaps shown in FIG. 11 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 may be provided with beat control circuitry 20 as shown in FIG. 1 for controlling the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

Figure 12:
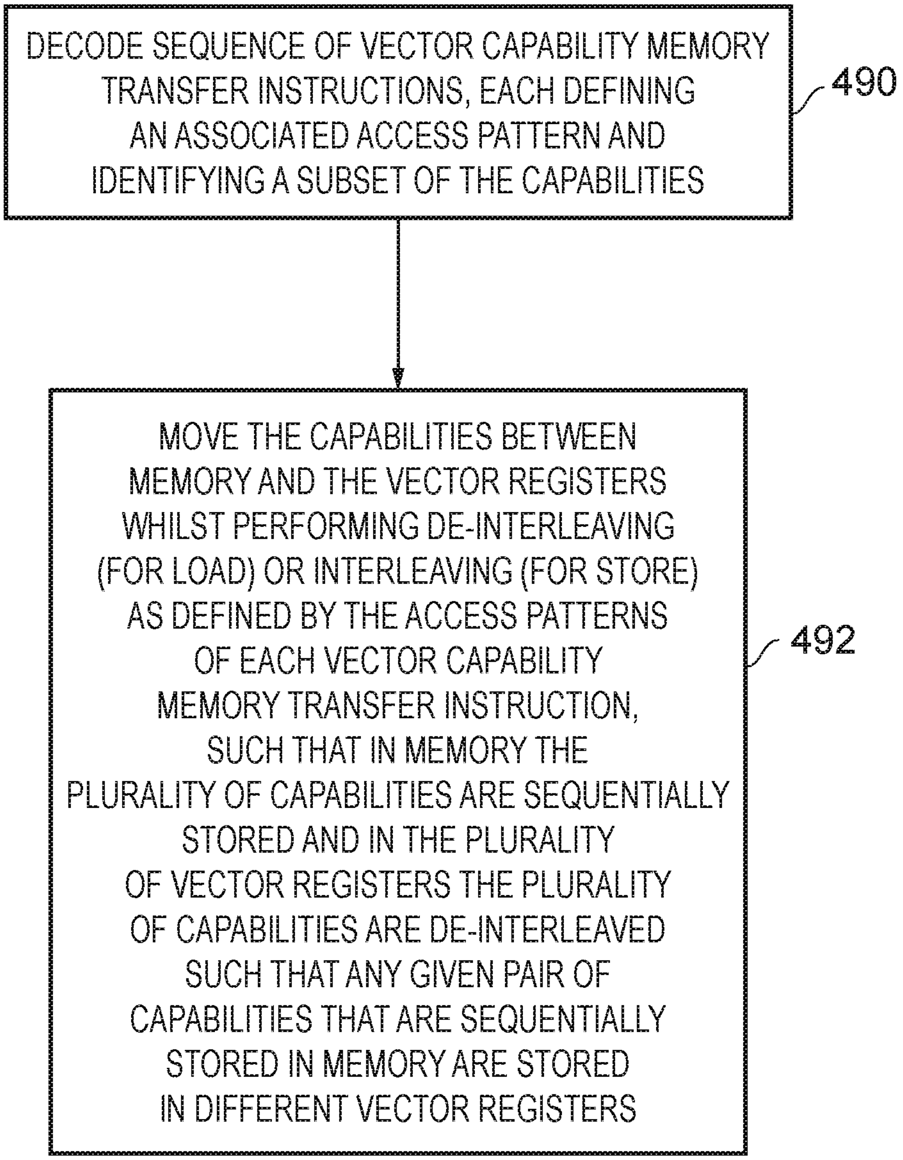
FIG. 12 is a flow diagram illustrating how a sequence of vector capability memory transfer instructions may be used in one example implementation in order to move the capabilities between memory and the vector registers in a way that ensures that the capabilities are stored in an arrangement within a plurality of vector registers that allows their use when performing gather and scatter operations in the manner described herein.

FIG. 12 is a flow diagram illustrating how a sequence of vector capability memory transfer instructions may be used to move a series of capabilities between memory and multiple vector registers, whilst performing the necessary rearrangements to ensure that those capabilities are stored within the vector registers in arrangements of the form illustrated by way of illustration with reference to the earlier examples of FIGS. 8A to 8C.

At step 490, a sequence of vector capability memory transfer instructions are decoded, where each such instruction defines an associated access pattern and identifies a subset of the capabilities that are required by any particular instance of the of earlier described vector gather/scatter instruction. In one example implementation, each individual vector capability memory transfer instruction identifies a different subset of capabilities to each other vector capability memory transfer instruction in the sequence.

At step 492, the capabilities are then moved between memory and identified vector registers whilst performing de-interleaving (in the event that a load operation is being performed) or interleaving (in the event that a store operation is being performed) as defined by the access patterns of each vector capability memory transfer instruction. As a result, the plurality of capabilities can be arranged to be sequentially stored in memory, whilst in the multiple vector registers the plurality of capabilities are de-interleaved such that any given pair of capabilities that are sequentially stored in memory are stored in different vector registers.

The plurality of vector capability memory transfer instructions used to perform the steps illustrated in FIG. 12 do not need to directly follow each other in program order, and hence do not need to be executed sequentially one after the other. Once all of the vector capability memory transfers instructions within the sequence have been executed then the required rearrangement of the capabilities as they are moved between the memory and the vector registers will have been performed.

Figure 13:
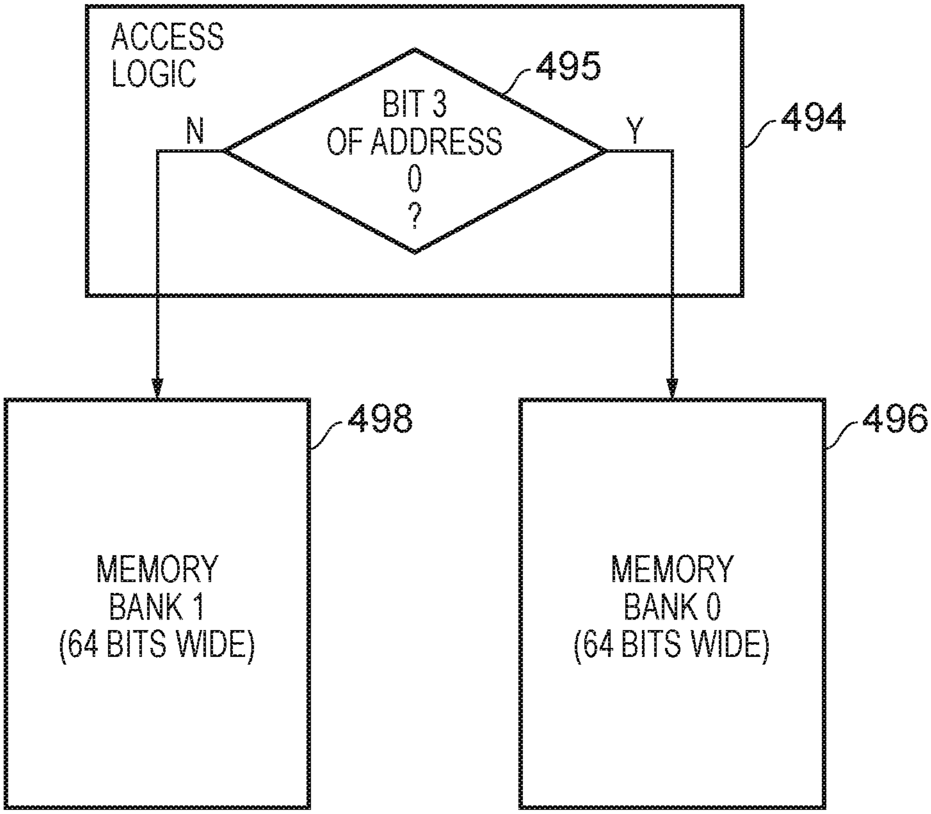
FIG. 13 schematically illustrates how different memory banks may be accessed when employing a sequence of vector capability memory transfer instructions to transfer capabilities between memory and the vector registers, in accordance with the techniques described herein.

In one example implementation, the memory is formed of multiple memory banks and, for each vector capability memory transfer instruction the access pattern is defined so as to cause more than one of the memory banks to be accessed when that vector capability memory transfer instruction is executed. Banked memory makes it easier for hardware to implement parallel transfers to/from memory, and hence specifying access patterns that enable this is beneficial. This is illustrated schematically in FIG. 13, for the example of a memory formed of two memory banks 496, 498, where each memory bank is 64 bits wide. With such a configuration of memory banks, then when the memory access logic 494 is processing a memory address, bit three of the address can be considered in order to determine which bank to access. In particular, if bit 3 of the address (i.e. the fourth address bit assuming the first address bit is bit 0) is a logic 0 value then memory bank 496 is accessed, whereas if bit 3 of the address is a logic 1 value then the other memory bank 498 is accessed. Since the capabilities are 64-bit capabilities, it will be appreciated that the odd capabilities will be stored in one bank, whilst even capabilities are stored in the other bank.

Purely by way of example, considering the arrangement of capabilities shown in FIG. 8A, sequentially located capabilities C0 to C3 in memory may be loaded into the capability registers 405 and 410 using the two vector capability memory transfer instructions as follows:

VLDRC2_1: $C0 \rightarrow Qn[63:0]$, $C3 \rightarrow Q(n+1)[127:64]$

VLDRC2_2: $C1 \rightarrow Q(n+1)[63:0]$, $C2 \rightarrow Qn[127:64]$

With reference to FIG. 12, it will be appreciated that when executing each of those instructions, both of the banks 496, 498 are accessed, since capability C0 will be in a different bank to capability C3 and capability C1 will be in a different bank to capability C2. Also, the two capabilities transferred by each instruction reside within different capability lanes of the vector registers, and hence in one example implementation can be written into the vector registers at the same time.

Figure 14:
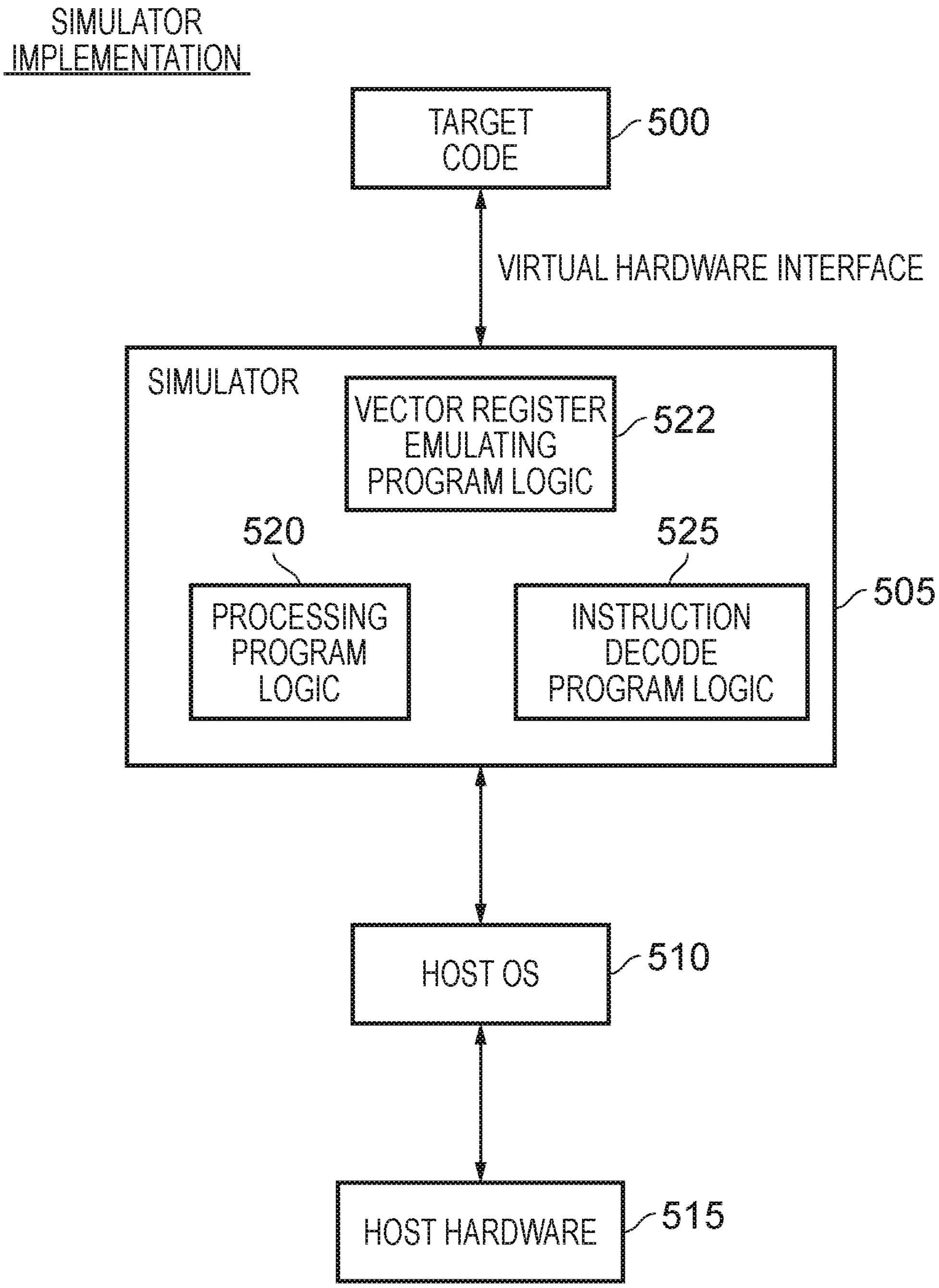
FIG. 14 shows a simulator example that can be used.

FIG. 14 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor.

Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 8 in the hardware apparatus 2 could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus 2 discussed above can emulate those features. The simulator program may include processing program logic 520 to emulate the behaviour of the processing circuitry 4, instruction decode program logic 525 to emulate the behaviour of the instruction decoder 6, and vector register emulating program logic 522 to maintain data structures to emulate the vector registers 12. Hence, the techniques described herein for performing vector gather or scatter operations using capabilities can in the example of FIG. 14 be performed in software by the simulator program 505.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:

processing circuitry;

a set of vector registers; and an instruction decoder configured to decode vector instructions to control the processing circuitry to perform vector processing operations specified by the vector instructions;

wherein:

the instruction decoder is responsive to a given vector memory access instruction specifying a plurality of memory access operations, where each memory access operation is to access an associated data element, to determine, from a data vector indication field of the given vector memory access instruction, at least one vector register in the set of vector registers associated with a plurality of data elements, and to determine, from at least one capability vector indication field of the given vector memory access instruction, a plurality of vector registers in the set of vector registers containing a plurality of capabilities, each capability being associated with one of the data elements in the plurality of data elements and providing an address indication and constraining information constraining use of that address indication when accessing memory, wherein the number of vector registers determined from the at least one capability vector indication field is greater than the number of vector registers determined from the data vector indication field;

the instruction decoder is further configured to control the processing circuitry:

to determine, for a given data element in the plurality of data elements, a memory address based on the address indication provided by the associated capability, and to determine whether a given memory access operation to be used to access the given data element is allowed in respect of that determined memory address having regard to the constraining information of an associated capability of the plurality of capabilities; and to enable performance of each memory access operation for which that memory access operation is allowed, where performance of the given memory access operation causes the given data element to be moved between the determined memory address in the memory and the at least one vector register.

2. The apparatus as claimed in claim 1, further comprising capability indication storage providing a valid capability indication field in association with an associated capability sized block within given vector registers of the set of vector registers, wherein each valid capability indication field is arranged to be set to indicate when the associated capability sized block stores a valid capability and is otherwise cleared.

3. The apparatus as claimed in claim 2, wherein the capability indication storage is incorporated within the set of vector registers.

4. The apparatus as claimed in claim 2, wherein the processing circuitry is configured to only allow any valid capability indication field to be set to indicate that a valid capability is stored in the associated capability sized block in response to execution of one or more specific instructions amongst a set of instructions that are executable by the apparatus.

5. The apparatus as claimed in claim 1, wherein the number of vector registers forming the plurality of vector registers determined from the at least one capability vector indication field is a power of two.

6. The apparatus as claimed in claim 1, wherein the at least one capability vector indication field is a single capability indication field arranged to identify one vector register and the instruction decoder is configured to determine the remaining vector registers of the plurality of vector registers based on a determined relationship.

7. The apparatus as claimed in claim 6, wherein the number of vector registers in the plurality of vector registers is 2 N, the single capability indication field is indicative of a first vector register number identifying the one vector register, where the first vector register number is constrained to have its N least significant bits at a logic zero value, and the instruction decoder is configured to generate vector register numbers for each of the remaining vector registers by reusing the first vector register number and selectively setting at least one of the N least significant bits to a logic one value.

8. The apparatus as claimed in claim 1, wherein for any given pair of data elements associated with adjacent locations in the at least one vector register, capabilities associated with each of the given pair of data elements are stored in different vector registers of said plurality of vector registers.

9. The apparatus as claimed in claim 1, wherein:

the at least one vector register determined from the data vector indication field comprises a single vector register, and each data element of the plurality of data elements is associated with a corresponding data lane of the single vector register;

each capability is located within a capability lane within one of the vector registers in said plurality of vector registers; and for the given data element, the vector register containing the associated capability is determined in dependence on a given number of least significant bits of a lane number of the corresponding data lane, and the capability lane containing the associated capability is determined in dependence on the remaining bits of the lane number of the corresponding data lane.

10. The apparatus as claimed in claim 9, wherein:

the number of vector registers in said plurality of vector registers containing the plurality of capabilities is P, considered logically as a sequence with values 0 to P−1, and the number of capability lanes in any given vector register is M, with values from 0 to M−1;

the data lane associated with the given data element is data lane X, with values from 0 to X−1, and the location of the associated capability within the plurality of vector registers is determined by dividing X by P to produce a quotient and a remainder, where the quotient identifies the capability lane containing the associated capability, and the remainder identifies the vector register containing the associated capability.

11. The apparatus as claimed in claim 1, wherein:

the set of vector registers is logically partitioned into a plurality of sections, where each section contains a corresponding portion from each of the vector registers in the set of vector registers;

the plurality of capabilities are located within the plurality of vector registers such that, for each data element of the plurality of data elements, the associated capability is stored within the same section as that data element; and execution of the given vector memory access instruction is divided into multiple beats, and during each beat only one section of the set of vector registers is accessed in order to execute the given vector memory access instruction.

12. The apparatus as claimed in claim 11, wherein the processing circuitry is configured to perform, over one or more beats, the memory access operations for accessing the data elements within a given section, before performing, over one or more beats, the memory access operations for the data elements within a next section.

13. The apparatus as claimed in claim 1, wherein:

the instruction decoder is configured to decode a plurality of vector capability memory transfer instructions that together cause the instruction decoder to control the processing circuitry to transfer a further plurality of capabilities between the memory and the plurality of vector registers, and to perform a rearrangement of the further plurality of capabilities during the transfer such that in the memory the further plurality of capabilities are sequentially stored and in the plurality of vector registers the further plurality of capabilities are de-interleaved such that any given pair of capabilities within said plurality that are sequentially stored in the memory are stored in different vector registers of said plurality of vector registers.

14. The apparatus as claimed in claim 13, wherein each vector capability memory transfer instruction is configured to identify different capabilities to each other vector capability memory transfer instruction, and each vector capability memory transfer instruction is configured to identify an access pattern that causes the processing circuitry to transfer the identified capabilities whilst performing the rearrangement specified by the access pattern.

15. The apparatus as claimed in claim 14, wherein:

the memory is formed of multiple memory banks; and for each vector capability memory transfer instruction, the access pattern is defined so as to cause more than one of the memory banks to be accessed when that vector capability memory transfer instruction is executed by the processing circuitry.

16. The apparatus as claimed in claim 1, wherein:

the at least one vector register determined from the data vector indication field of the given vector memory access instruction comprises a single vector register, the capabilities are twice the size of the plurality of data elements, and the plurality of vector registers determined from the at least one capability vector indication field comprise two vector registers.

17. The apparatus as claimed in claim 1, wherein the given vector memory access instruction further comprises an immediate value indicative of an address offset, and the processing circuitry is configured to determine, for the given data element in the plurality of data elements, the memory address of the given data element by combining the address offset with the address indication provided by the associated capability.

18. The apparatus as claimed in claim 1, wherein the given vector memory access instruction further comprises an immediate value indicative of an address offset, and, for the given data element, the processing circuitry is configured to update the address indication of the associated capability in the plurality of vector registers by adjusting the address indication in dependence on the address offset.

19. A method of performing memory access operations within an apparatus providing processing circuitry to perform vector processing operations and a set of vector registers, the method comprising:

receiving a given vector memory access instruction specifying a plurality of memory access operations, where each memory access operation is to access an associated data element, and employing an instruction decoder to determine, from a data vector indication field of the given vector memory access instruction, at least one vector register in the set of vector registers associated with a plurality of data elements, and to determine, from at least one capability vector indication field of the given vector memory access instruction, a plurality of vector registers in the set of vector registers containing a plurality of capabilities, each capability being associated with one of the data elements in the plurality of data elements and providing an address indication and constraining information constraining use of that address indication when accessing memory, wherein the number of vector registers determined from the at least one capability vector indication field is greater than the number of vector registers determined from the data vector indication field;

controlling the processing circuitry:

to determine, for a given data element in the plurality of data elements, a memory address based on the address indication provided by the associated capability, and to determine whether a given memory access operation to be used to access the given data element is allowed in respect of that determined memory address having regard to the constraining information of an associated capability of the plurality of capabilities; and to enable performance of each memory access operation for which that memory access operation is allowed, where performance of the given memory access operation causes the given data element to be moved between the determined memory address in the memory and the at least one vector register.

20. A non-transitory computer-readable medium storing a computer program for controlling a host data processing apparatus to provide an instruction execution environment, comprising:

processing program logic;

vector register emulating program logic to emulate a set of vector registers; and instruction decode program logic to decode vector instructions to control the processing program logic to perform vector processing operations specified by the vector instructions;

wherein:

the instruction decode program logic is responsive to a given vector memory access instruction specifying a plurality of memory access operations, where each memory access operation is to access an associated data element, to determine, from a data vector indication field of the given vector memory access instruction, at least one vector register in the set of vector registers associated with a plurality of data elements, and to determine, from at least one capability vector indication field of the given vector memory access instruction, a plurality of vector registers in the set of vector registers containing a plurality of capabilities, each capability being associated with one of the data elements in the plurality of data elements and providing an address indication and constraining information constraining use of that address indication when accessing memory, wherein the number of vector registers determined from the at least one capability vector indication field is greater than the number of vector registers determined from the data vector indication field;

the instruction decode program logic is further configured to control the processing program logic:

to determine, for a given data element in the plurality of data elements, a memory address based on the address indication provided by the associated capability, and to determine whether a given memory access operation to be used to access the given data element is allowed in respect of that determined memory address having regard to the constraining information of an associated capability of the plurality of capabilities; and to enable performance of each memory access operation for which that memory access operation is allowed, where performance of the given memory access operation causes the given data element to be moved between the determined memory address in the memory and the at least one vector register.

* * * * *